United States Patent
Coward et al.

(10) Patent No.: US 6,204,951 B1
(45) Date of Patent: Mar. 20, 2001

(54) ELECTRO-OPTIC MODULATOR WITH IMPROVED HARMONIC PERFORMANCE

(75) Inventors: James F. Coward, San Francisco; Ting K. Yee, Foster City; Peter Chang, San Jose, all of CA (US); Abraham Kou, Mercer Island, WA (US)

(73) Assignee: Keotrel Solutions, Inc., Mountain View (CA)

(*) Notice: Subject to any disclaimer, the term of this patent is extended or adjusted under 35 U.S.C. 154(b) by 0 days.

(21) Appl. No.: 09/082,620

(22) Filed: May 19, 1998

Related U.S. Application Data

(60) Provisional application No. 60/047,344, filed on May 21, 1997.

(51) Int. Cl.[7] .................. G02F 1/03; G02F 1/01; G02F 1/035; H04J 14/02
(52) U.S. Cl. .............. 359/245; 359/127; 359/128; 385/1; 385/2
(58) Field of Search .................. 359/128, 127, 359/183, 245; 385/1, 2, 3, 8, 4

(56) References Cited

U.S. PATENT DOCUMENTS

| | | | |
|---|---|---|---|
| 5,004,314 | 4/1991 | Booth et al. | 350/96.14 |
| 5,040,865 | 8/1991 | Chen et al. | 350/96.14 |
| 5,101,450 | * 3/1992 | Ohlshansky | 385/3 |
| 5,109,441 | 4/1992 | Glaab | 385/1 |
| 5,119,447 | 6/1992 | Trisno | 385/3 |
| 5,148,503 | 9/1992 | Skeie | 385/3 |
| 5,161,206 | 11/1992 | Djupsjobacka | 385/2 |
| 5,199,086 | 3/1993 | Johnson et al. | 385/2 |
| 5,278,923 | * 1/1994 | Nazarathy | 385/3 |
| 5,323,406 | 6/1994 | Yee et al. | 372/26 |
| 5,359,680 | 10/1994 | Riviere | 385/9 |
| 5,369,522 | 11/1994 | Tangonan et al. | 359/329 |
| 5,416,858 | 5/1995 | Riviere | 385/1 |
| 5,532,857 | 7/1996 | Gertel et al. | 359/154 |

OTHER PUBLICATIONS

R.F. Kalman and L.G. Kazovsky, "Demonstration of an Analog Heterodyne Interferometric Phase Modulated (HIPM) Link", *IEEE Phototonics Technology Letters*, vol. 6, No. 10, Oct. 1994, pp. 1271–1273.

R.F. Kalman, J.C. Fan, and L.G. Kazovsky, "A Novel Analog Optical Link with High Dynamic Range", *IEEE Phototonics Technology Letters*, vol. 5, No. 6, Jun. 1993, pp. 725–728.

Anders Djupsjöbacka, "A Linearization Concept for Integrated–Optic Modulators", *IEEE Photonics Technology Letters*, vol. 4, No. 8, Aug. 1992, pp. 869–872.

Zhou Z. Yue, Suning Tang, Ray T. Chen, A Linear Electro–Optic Modulator Based on an Array of Mach–Zehnder Interferometers, *SPIE*, vol. 3288, pp. 232–241.

M. Jamil Ahmed, L. Young, "Integrated Optic Series and Multibranch Interferometers", *Journal of Lightwave Technology*, vol. LT–3, No. 1, Feb. 1985.

\* cited by examiner

*Primary Examiner*—Georgia Epps
*Assistant Examiner*—Michael A. Lucas
(74) *Attorney, Agent, or Firm*—Fenwick & West LLP

(57) ABSTRACT

An electro-optic modulator includes a splitting section, at least three transmission legs, an RF phase-shifting section, a DC-phase shifting section, and a combining section. The splitting section splits a received optical signal into sub-signals, one for each transmission leg. The RF phase-shifting section phase shifts at least two of the sub-signals by an amount proportional to a received RF signal; while the DC phase-shifting section phase shifts at least two of the sub-signals by a DC phase. The combining section combines the phase-shifted sub-signals into a modulated optical signal. In a preferred embodiment, the modulator is characterized by design parameters, such as splitting ratio, DC phase shift, RF coupling efficiency, and combining ratio, and these design parameters are selected to ensure that the modulator meets predetermined performance characteristics, such as maximum harmonic levels or minimum signal to noise ratios.

43 Claims, 15 Drawing Sheets

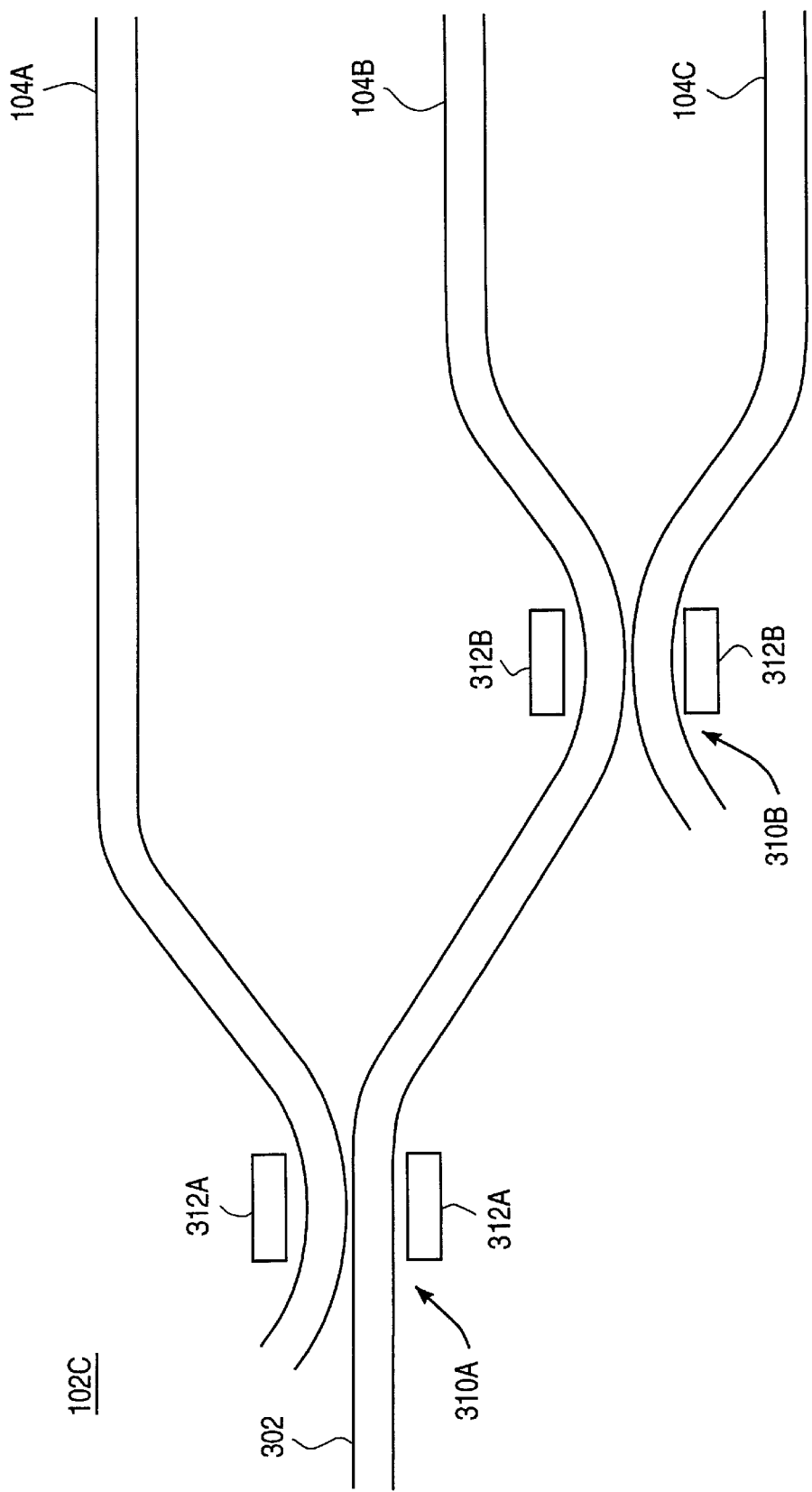

ELECTRO-OPTIC MODULATOR WITH IMPROVED HARMONIC PERFORMANCE

CROSS-REFERENCE TO RELATED APPLICATION

This application claims the benefit of U.S. Provisional Patent Application Ser. No. 60/047,344, "An Electro-optic Modulator with Improved Harmonic Performance and Optical Transmission System Using the Same", by James F. Coward, filed May 21, 1997, which subject matter is incorporated herein by reference.

BACKGROUND OF THE INVENTION

1. Field of the Invention

This invention relates generally to electro-optic modulators and, more particularly, to modulators with improved harmonic performance resulting from the use of multiple legs.

2. Description of the Related Art

As the result of continuous advances in technology, particularly in the areas of networking and telecommunications, there is an increasing demand for capacity for the transmission of data. Optical fiber is a transmission medium which is well-suited to meet this demand since optical fiber has an inherent bandwidth which is much greater than metal-based conductors, such as twisted pair or coaxial cable. Existing optical fiber communication systems are typically based on a modulator, a fiber link, and a photodetector. The modulator modulates an optical carrier with the data to be transmitted. The modulated optical carrier is transmitted across the fiber link. The photodetector then detects the modulated optical carrier at the other end of the fiber link, recovering the transmitted data.

Protocols such as OC-3, OC-12, etc. have been developed for the transmission of data over such optical fiber systems. These protocols, however, typically use simple modulation schemes which result in low bandwidth efficiencies. As an example, the OC protocol is based on on-off keying, which is a bandwidth inefficient modulation scheme. In theory, the capacity of optical fiber systems could be increased by the use of more bandwidth-efficient modulation schemes, such as quadrature amplitude modulation. However, these schemes result in more stringent requirements on the performance characteristics of the overall system, including on the modulator. For example, the acceptable harmonic levels for a modulator are lower for quadrature amplitude modulation than they are for on-off keying.

The development of new networking architectures and applications also results in new and different performance requirements. For example, the broadcast television format is based on fixed bandwidth, analog transmission channels separated by guard bands. As a result, modulators used in the distribution of cable television typically have stringent requirements on harmonics which fall within the transmission channel (e.g., requirements on in-band spur to signal power) but may have laxer requirements on the harmonics which fall within the guard bands.

As another example, a data transmission system may frequency upshift the data to be transmitted so that the up-shifted signal occupies less than one octave. This effectively eliminates any requirements on second harmonics. As a result, a modulator which exhibited good in-band performance, even at the expense of higher second order harmonics, would be desirable for such a system.

Conversely, increasing the transmission rate of a system results in a wider operating bandwidth for the system. As the bandwidth is expanded, however, more harmonics will fall within the operating bandwidth. As a result, it would be desirable to tailor the modulator's harmonic performance such that these in-band harmonics are reduced.

Many of the performance requirements described above could be realized if the harmonic performance of the optical modulator could be manipulated. Current modulator technology, however, is ill-suited for this purpose.

Standard Mach-Zehnder modulators (MZM) are inherently non-linear and it is difficult to manipulate their harmonic performance. For example, one of their characteristics is that the ratio of the third harmonic to the signal is constant, so that the third harmonic cannot be manipulated independent of the signal. Hence, if an application required elimination of the third harmonic, a standard MZM could not achieve this performance requirement without also eliminating the signal.

As a result, MZM-based systems which have specific harmonic requirements must compensate for the inherent drawbacks of MZMs in some other fashion. In one approach, the non-linearity of the MZM operating curve is compensated for by operating the MZM only over a small portion of the operating curve. This reduces some of the unwanted higher harmonics. However, as noted above, other harmonics (such as the third) are reduced in magnitude only because the signal is proportionally reduced in magnitude. Reducing the signal also results in a lower signal to noise ratio, thus reducing the useful range of such a system.

In another approach, electronics predistort the data to be transmitted in order to compensate for the MZM's non-linearity. Alternately, the data may be simultaneously transmitted through two different MZM's, each with a different harmonic characteristic. The corresponding recovered electronic signals, each with a different harmonic composition, is then combined electronically to cancel the unwanted harmonics. Both of these approaches, however, require additional electronics. In addition, for high speed systems, the electronics may also significantly limit the overall speed and bandwidth of the system.

Modulators other than standard MZMs also suffer from significant drawbacks. For example, many non-standard designs attempt to manipulate the overall modulator performance by creating multiple, different RF signals from a single data stream, modulating the optical carriers in the modulator with these RF signals, and then optically combining the modulated optical signals. The RF signals are selected such that the subsequent optical combining results in the desired performance. For example, one RF signal may be a modulated version of the data stream, while a second RF signal may include an upshifted, carrierless version of the first RF signal. This approach, however, requires additional electronics with the drawbacks noted above. The application of multiple RF signals to the same modulator also introduces difficulties. For example, the electrodes for the RF signals must be precisely matched or the mismatch may limit the overall bandwidth and speed of the system.

Other non-standard modulators have been designed for specific, limited purposes, such as the suppression of the carrier frequency. However, these modulators do not have the flexibility to manipulate the overall harmonic structure. For example, the carrier-suppressing modulators simply suppress the carrier; the harmonic sidelobe structure is unaffected.

Thus, there is a need for electro-optic modulators which can be tailored to meet a required harmonic performance and particularly for such modulators which can be operated at high speeds and large bandwidths.

SUMMARY OF THE INVENTION

In accordance with the present invention, an electro-optic modulator includes a splitting section, at least three transmission legs, an RF phase-shifting section, a DC-phase shifting section, and a combining section. The splitting section splits a received optical signal into sub-signals, one for each transmission leg. The RF phase-shifting section phase shifts at least two of the sub-signals by an amount proportional to a received RF signal; while the DC phase-shifting section phase shifts at least two of the sub-signals by a DC phase relative to a reference sub-signal. The combining section combines the phase-shifted sub-signals into a modulated optical signal. In a preferred embodiment, the modulator is characterized by design parameters, such as splitting ratio, DC phase shift, RF coupling efficiency, and combining ratio, and these design parameters are selected to ensure that the modulator meets a desired harmonic performance, such as staying below maximum acceptable levels for higher order terms, and/or maximizing signal strength or signal to noise ratio.

The present invention is particularly advantageous because current modulator technology is ill-suited to meet many of the desired harmonic performances required by current applications. For example, modulators in accordance with the present invention have more design degrees of freedom than conventional MZMs, thus resulting in more flexibility in tailoring the modulator's harmonic performance. As a result, the need for auxiliary electronics is also minimized. Furthermore, certain embodiments utilize a single RF signal, thus avoiding the problem of mismatched RF signals and the corresponding loss of bandwidth.

In another aspect of the invention, the design parameters are selected according to the following method. An output of the modulator is expressed in terms of the design parameters. The output is also expanded in a series, preferably a power series or Fourier series. The desired harmonic performance is applied to the series expansion, resulting in constraints on the design parameters. The design parameters are then selected subject to these constraints.

In further accordance with the invention, a method for modulating an optical signal includes the following steps. First, an optical signal is received. The received optical signal is split into at least three sub-signals. At least two of these are phase shifted by an amount proportional to a received RF signal; and at least two are phase shifted by a DC phase. The RF phase-shifted and DC phase-shifted subsignals are re-combined into a modulated optical signal. These steps together achieve a desired harmonic performance.

BRIEF DESCRIPTION OF THE DRAWING

The invention has other advantages and features which will be more readily apparent from the following detailed description of the invention and the appended claims, when taken in conjunction with the accompanying drawing, in which:

FIGS. 3A–C are diagrams of various embodiments of splitting section 102 of FIG. 1;

DETAILED DESCRIPTION OF THE PREFERRED EMBODIMENTS

Introduction

Figure 1:
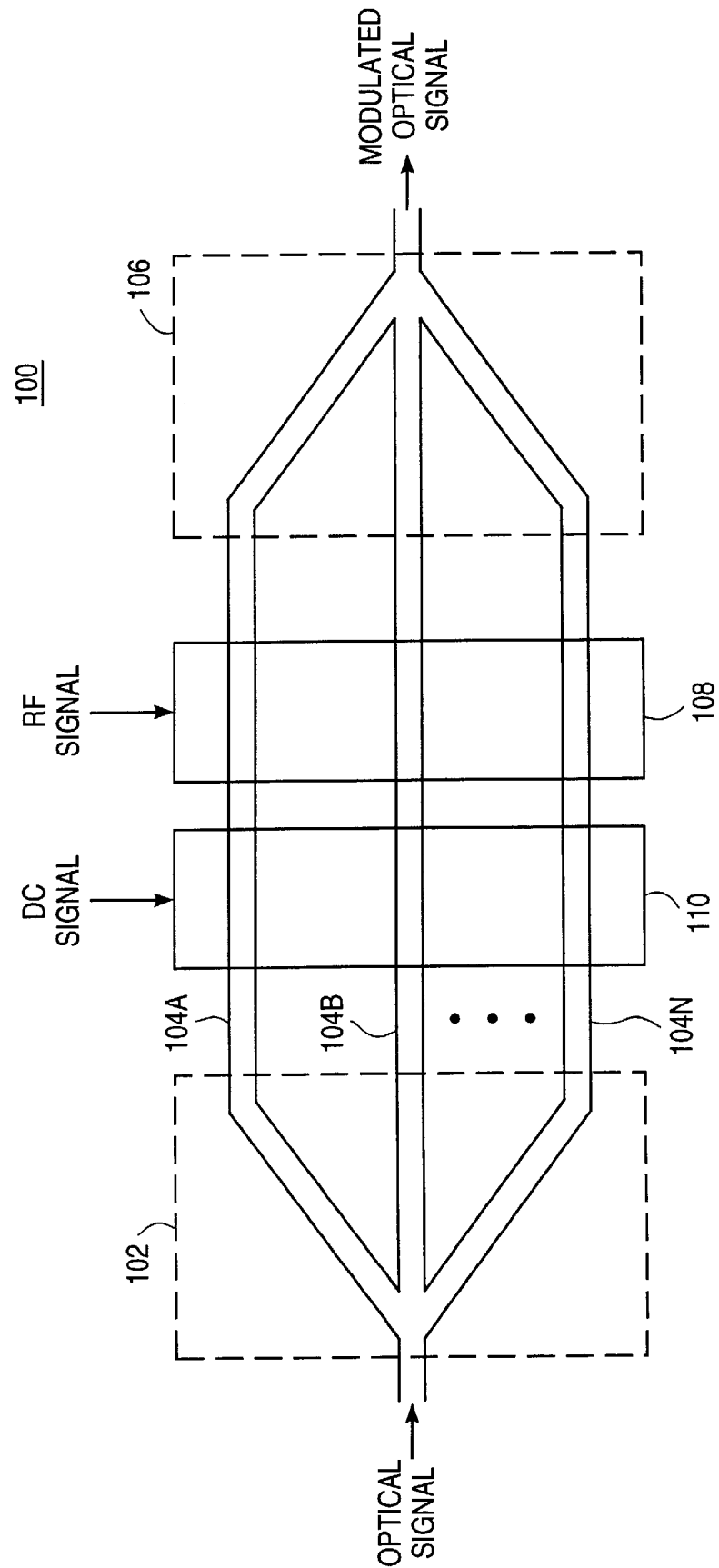
FIG. 1 is a diagram of a modulator in accordance with the present invention.

FIG. 1 is a diagram of a modulator 100 in accordance with the present invention. The modulator 100 includes a 1:N splitting section 102, N transmission legs 104A–N (collectively 104), and a N:1 combining section 104, where N is at least three for reasons which will become apparent below. Each of the transmission legs 104 has two ends, one optically coupled to one of the N outputs of the splitting section 102 and the other optically coupled to one of the N inputs to the combining section 104. The modulator 100 further includes an RF phase-shifting section 108 and a DC phase-shifting section 110, both coupled to introduce phase shifts to optical waves traveling through the transmission legs 104.

Figure 2:
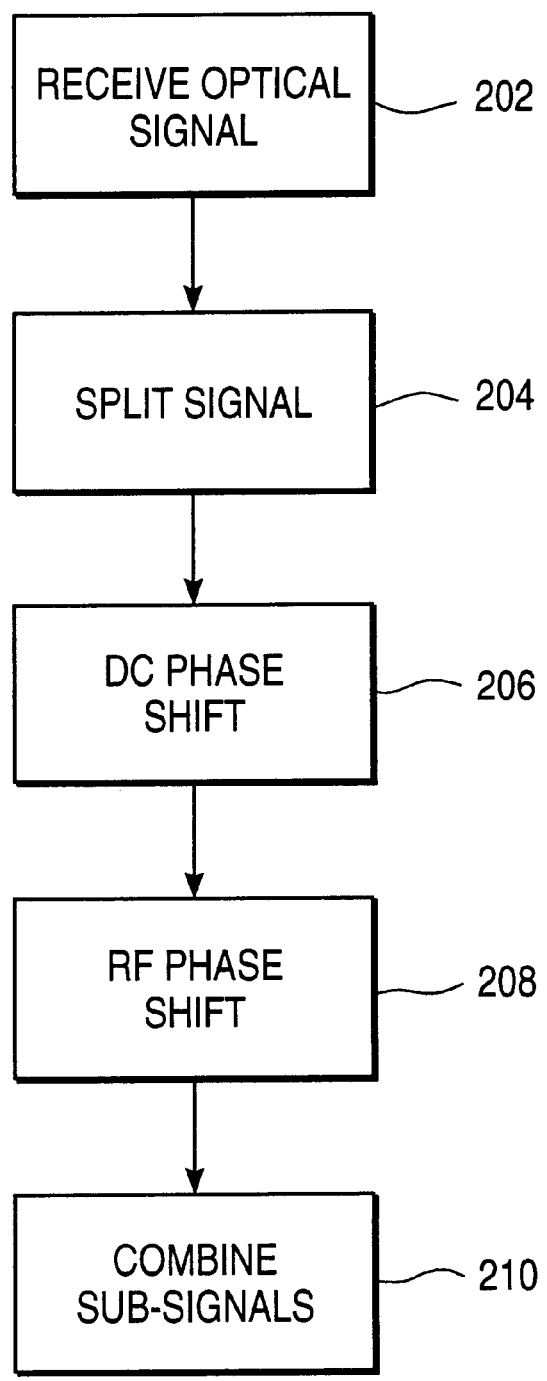
FIG. 2 is a flow diagram illustration operation of modulator 100.

FIG. 2 is a flow diagram illustration operation of modulator 100. The modulator 100 receives 202 an optical signal from an external source, such as a laser. The splitting section 102 splits 204 the received optical signal into N parts, which shall be referred to as "sub-signals," according to a splitting ratio, with each of the N sub-signals coupled into one of the N transmission legs 104. For example, if N=3, then the splitting section 102 may split 204 the received signal according to the splitting ratio 2:2:1, in which case the power of the sub-signals coupled into legs 104A and 104B will be twice that of the sub-signal coupled into leg 104C. If the splitting section 102 were 100% efficient, then 40% of the received signal would be coupled into each of legs 104A and 104B and 20% would be coupled into leg 104C. The DC phase-shifting section 110 introduces 206 a DC phase shift to one or more of the sub-signals traveling through the transmission legs 104 relative to the sub-signals in other legs 104. For example, in the N=3 case, the DC phase-shifting section 110 could introduce 206 constant phase shifts of 84 and −47 degrees to the sub-signals traveling through legs 104B–C relative to the sub-signal in leg 104A. Similarly, the RF phase-shifting section 108 introduces 208 a phase shift proportional to a received RF signal to one or more of the sub-signals in legs 104. The constant of proportionality will be referred to as the RF coupling efficiency. Continuing the previous example, the RF phase-shifting section 108 might produce 208 phase shifts according to RF coupling efficiencies of 0, 1.1 and 2.3 degrees/volt in each of the legs 104A–C. It should be understood that FIG. 2 does not imply that the DC phase shift 206 must precede the RF phase shift 208. In fact, the RF phase shift 208 may be introduced first or both DC and RF phase shifts 206 and 208 may be introduced simultaneously. The combining section 106 then receives the phase-shifted sub-signals from each of the N transmission legs 104 and combines 210 them according to a combining ratio, producing an optical signal modulated by the RF signals received by the RF phase-shifting section 108. The combining ratio is analogous to the splitting ratio. For example, a combining section 106 with a combining ratio of 2:2:1 would behave the same as a splitting section 102 with a splitting ratio of 2:2:1 if it were used in reverse.

The various parameters, such as splitting ratio, DC phase shift, RF coupling efficiency, and combining ratio, are design degrees of freedom which may be varied from one modulator design to another in order to optimize a desired performance characteristic. For example, these parameters can be adjusted to achieve a specific harmonic performance and/or signal to noise performance, as will be described below. Before describing this optimization process, however, FIGS. 3–8 further describe the structure and operation of modulator 100, in the context of an N=3 modulator.

Structure

Figure 3A:
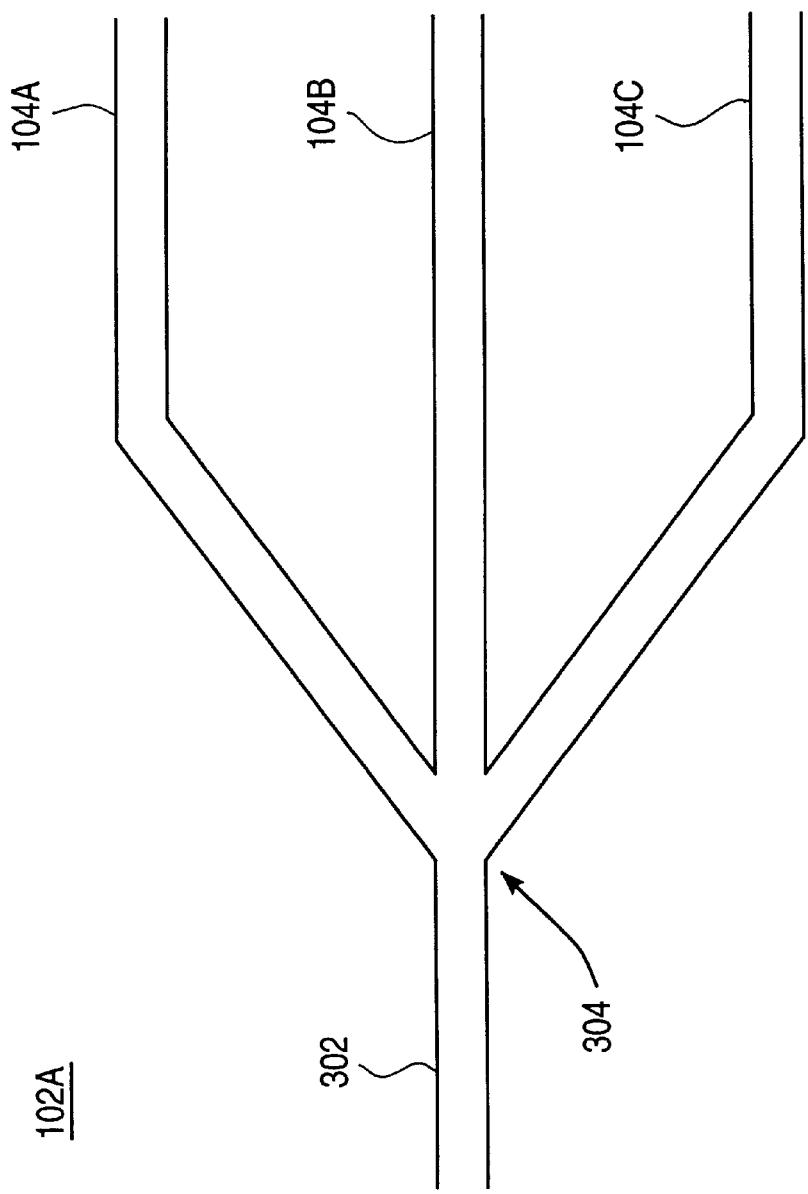
Figure 3B:
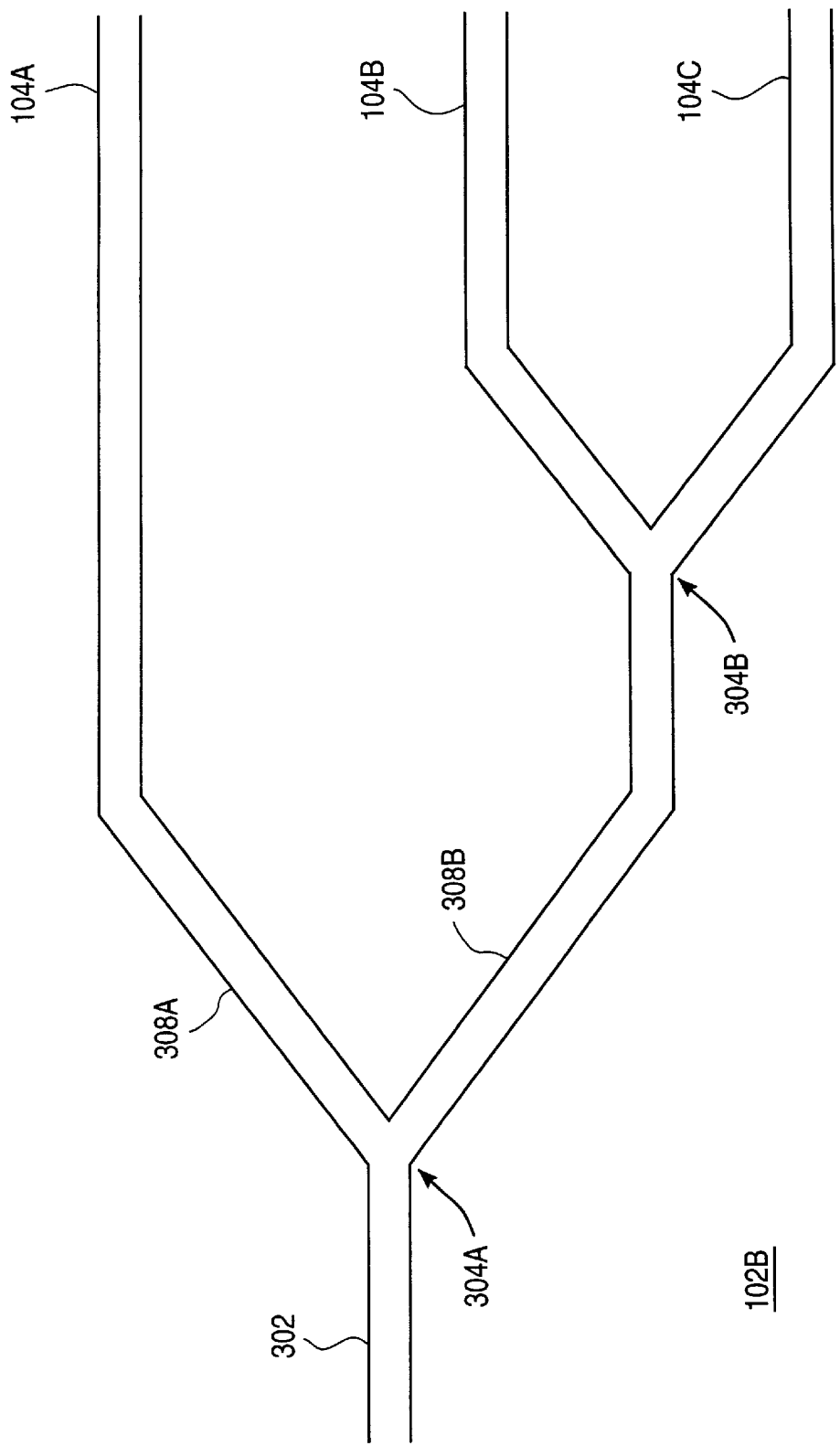

FIGS. 3A–C are diagrams of various embodiments of splitting section 102 of FIG. 1. In these embodiments, the splitting section 102 is implemented using integrated optics technology and may be manufactured on the same substrate as the remainder of modulator 100. The splitting sections of FIGS. 3A–B have fixed (i.e., not dynamically adjustable) splitting ratios.

FIG. 3A is a diagram of a splitting section 102A in which the incoming transmission leg 302 is simultaneously split by a 3-prong Y junction 304 into the 3 transmission legs 104A–C. This splitting section 102A can reduce the overall length and/or area occupied by the splitting section 102A since the splitting occurs all at one location and does not take place over multiple, cascaded stages. Depending on the splitting ratio desired, however, this splitting section 102A may be difficult to manufacture. In a variant of FIG. 3A, the 3-prong Y junction 304 may be implemented by a standard fiber optic 1:3 splitter. This may simplify the manufacture of the rest of modulator 100 since the splitting section 102A and transmission legs 104 are not integrated onto a common substrate, but at the expense of an additional coupling interface between splitting section 102A and transmission legs 104 and also at the expense of generally worse phase stability for splitting section 102A. Yet another alternative is to manufacture the splitting section 102A on a doped glass waveguide chip separate from the transmission legs 104. Like the 1:3 fiber splitter, this variant would simplify the manufacture of the rest of modulator 100 but would have better phase stability than the fiber splitter. However, it would still require an additional coupling interface, typically a butt coupled interface, between splitting section 102A and transmission legs 104.

FIG. 3B is an embodiment which creates splitting section 102B by cascading standard Y splitters 304A–B. The use of standard Y splitters 304A–B results in easier manufacturing, but the cascading leads to longer lengths and larger areas for the splitting section 102B. In FIG. 3B, a first Y splitter 304A splits the incoming transmission leg 302 into two parts: 308A, which leads to transmission leg 104A, and 308B, which leads to the second Y splitter 304B. The second Y splitter 304B splits part 308B into two, thus yielding the remaining two legs 104B–C.

FIG. 3C is a diagram of one embodiment of a splitting section 102C with a dynamically adjustable splitting ratio. This embodiment uses the cascaded architecture of FIG. 3B, but the Y splitters 304A–B are replaced by adjustable 2×2 couplers 310A–B. The coupling ratio of each coupler 310A–B is determined by the voltage applied across electrode pairs 312A and 312B, respectively. Adjustable splitters, such as 2×2 couplers 310, are more flexible than fixed splitters, such as Y splitters 304, since the splitting ratio may be dynamically adjusted and so the same modulator may be tuned for different configurations. In addition, the adjustment of the splitting ratios may be used to compensate for deviations in the splitting ratio due to manufacturing variations. Splitters with fixed splitting ratios, however, typically are less expensive and simpler to manufacture.

The embodiments in FIGS. 3A–C are exemplary only. Other embodiments will be apparent. For example, the Y splitters 304 may be replaced by other types of splitters, such as fixed 2×2 couplers. Similarly, the adjustable couplers 310 may be replaced by adjustable Y splitters. Alternatively, the first Y splitter 304A may be replaced by an adjustable 2×2 coupler; while the second Y splitter 304B is replaced by a fixed 2×2 coupler.

Figure 4:
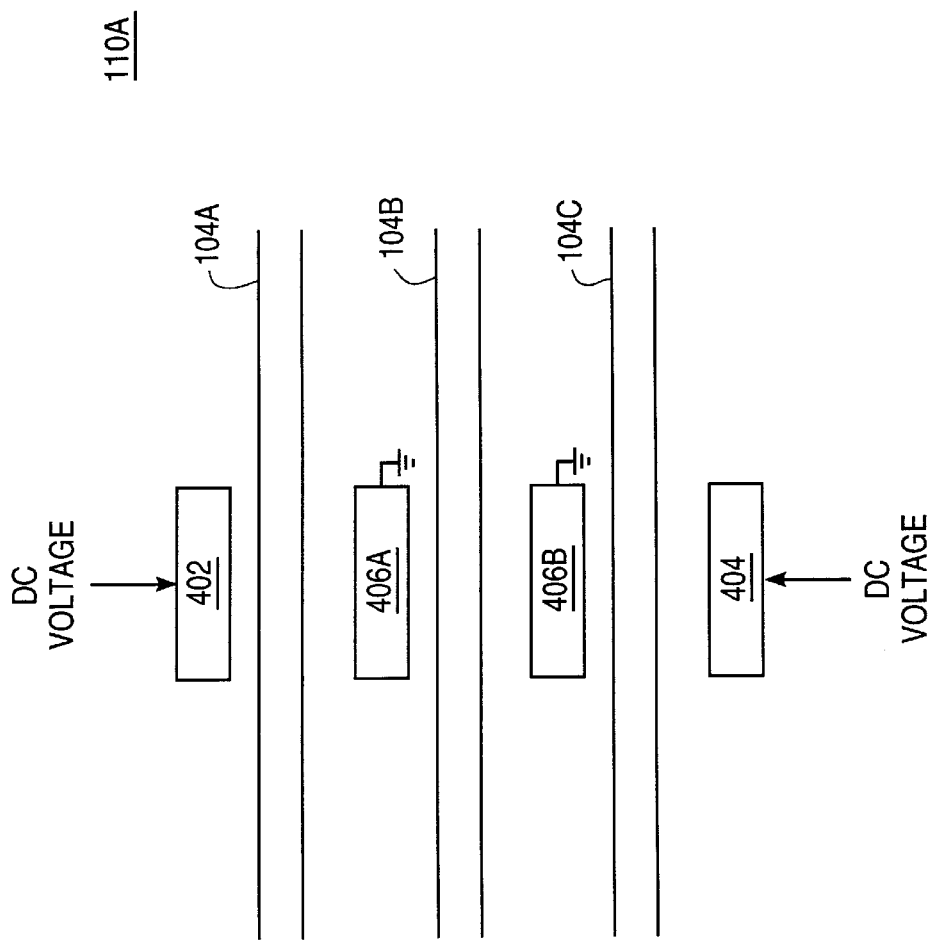
FIG. 4 is a diagram of one embodiment of DC phase-shifting section 110 of FIG. 1.

FIG. 4 is a diagram of one embodiment of DC phase-shifting section 110 of FIG. 1. In this embodiment, the transmission legs 104 are straight waveguides running parallel to each other and are constructed of electro-optic material. The DC phase-shifting section 110A includes two DC electrodes 402 and 404, and two ground electrodes 406A–B. Transmission leg 104A is located between DC electrode 402 and ground electrode 406A. A DC voltage applied to DC electrode 402 causes an electric field in the electro-optic material of leg 104A, thus introducing a constant phase shift in the sub-signal traveling through leg 104A. Similarly, DC electrode 404 and ground electrode 406B are used to introduce a constant phase shift in the sub-signal traveling through leg 104C. Leg 104B is used as a reference. That is, the DC phase shifts introduced in legs 104A and 104C are not strictly DC. Rather, they maintain a constant phase between the sub-signals in legs 104A and 104C with respect to the sub-signal in reference leg 104B. The embodiment of FIG. 4 provides complete design freedom with respect to the DC phase shifts introduced in the three transmission legs 104. Generally speaking, N-1 DC phase shifts are required for complete design freedom.

In FIG. 4, the electrodes 402, 404 and 406 are shown located in a region where the waveguides 104 are running parallel to one another, but other embodiments will be apparent. For example, referring to FIG. 3B, one electrode pair may apply a DC voltage across region 308A; while a second electrode pair applies a DC voltage across leg 104B. Alternatively, the DC voltages may be applied across region 308B and leg 104C, respectively. In addition, FIG. 4 only depicts a portion of the electrodes 402, 404, and 406. For example, the electrodes may cross the waveguides at various points due to manufacturing considerations.

Figure 5A:
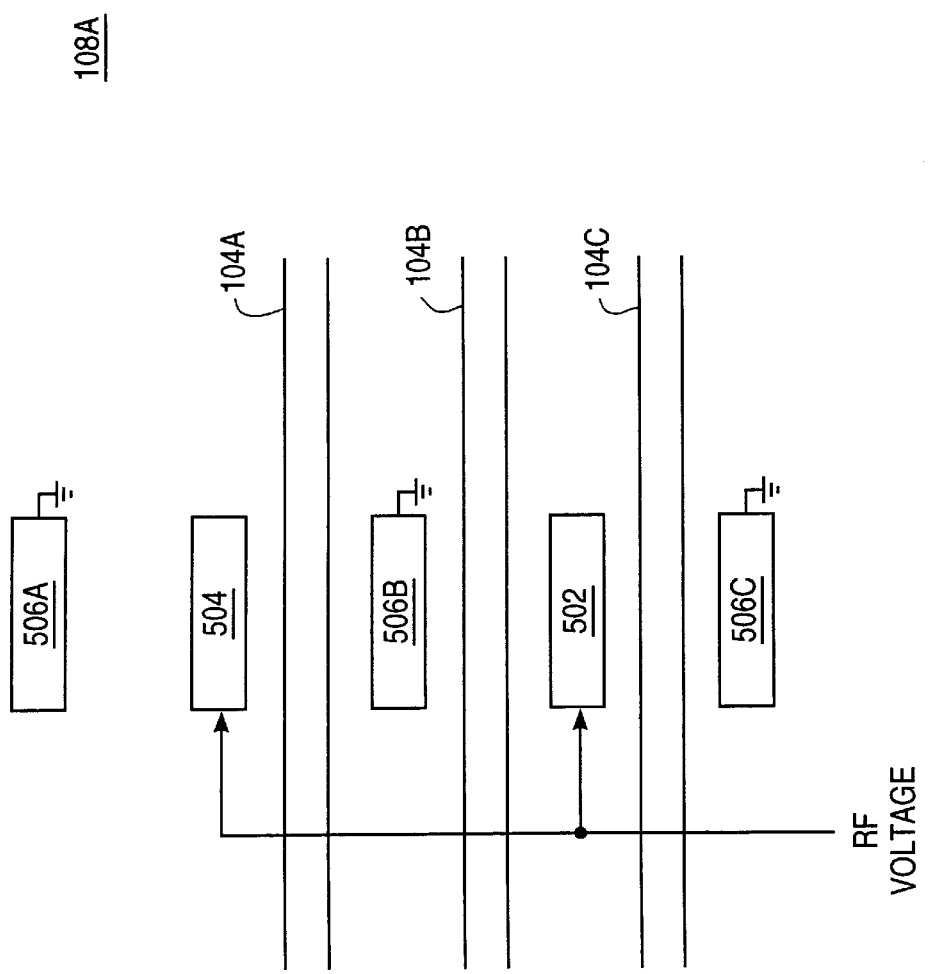
FIGS. 5A–C are diagrams of various embodiments of RF phase-shifting section 108 of FIG. 1.
Figure 5B:
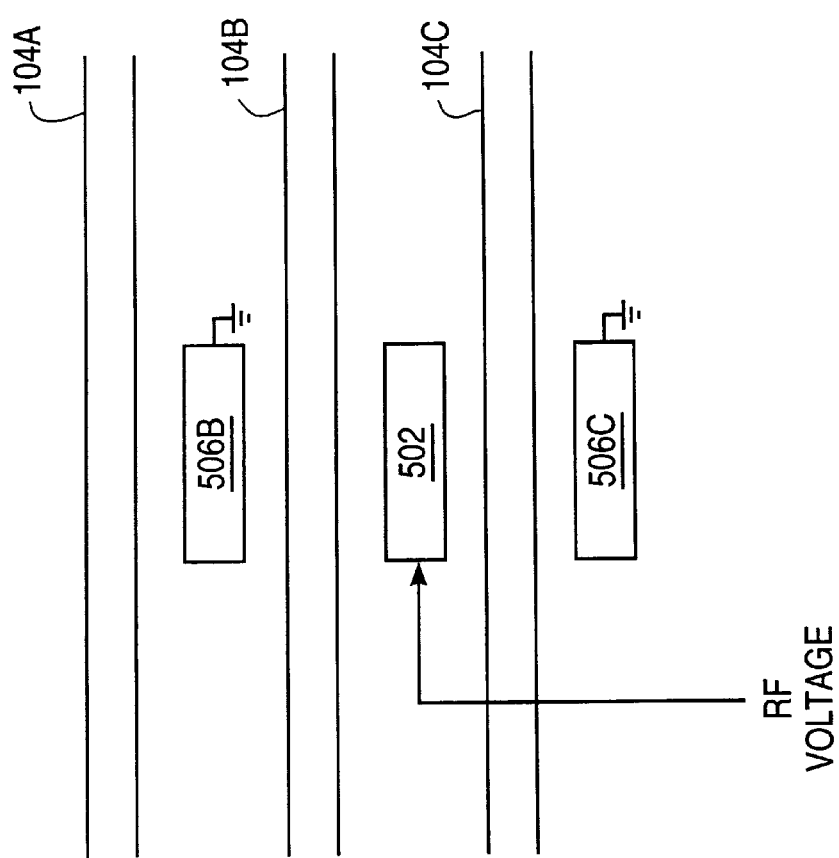
Figure 5C:
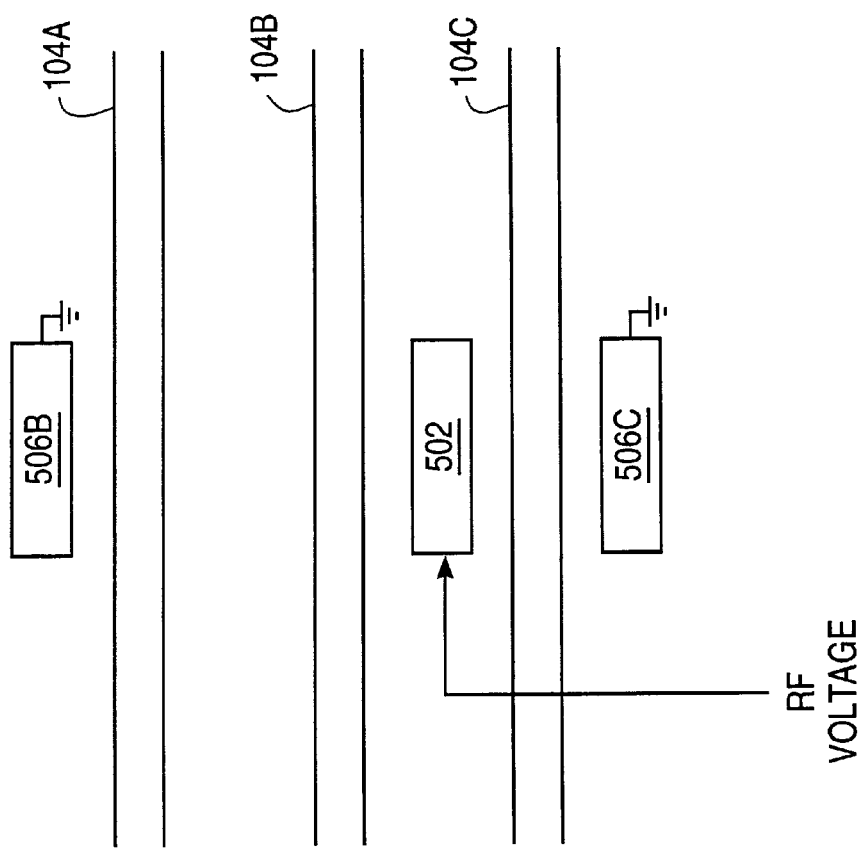

FIGS. 5A–C are diagrams of various embodiments of RF phase-shifting section 108 of FIG. 1. As used in this description, the RF frequency region means what is conventionally considered the RF region but also extending into the microwave and millimeter wave regimes, including frequencies ranging from less than 10 MHz to greater than 10 GHz. In FIGS. 5A–C, the transmission legs 104 are straight waveguides running parallel to each other and are constructed of electro-optic material, as in FIG. 4. The RF phase-shifting section 108 consists primarily of the placement of RF electrodes.

In FIG. 5A, the RF phase-shifting section 108A includes two RF electrodes 502 and 504 and three ground electrodes 506A–C. RF electrode 502 is located between legs 104B and 104C and ground electrodes 506B–C are located on the opposite sides of legs 104B and 104C, thus creating a standard push/pull configuration and modulation of legs 104B and 104C. RF electrode 504 is located on the far side of leg 104A with ground electrode 506A on the far side of RF electrode 504, thus allowing for RF modulation of leg 104A.

FIGS. 5B–C are embodiments which use a single RF electrode. The embodiment of FIG. 5B is the same as that of FIG. 5A, but RF electrode 504 and ground electrode 506A are eliminated. The resulting structure generates electric fields in legs 104B and 104C, thus introducing phase shifts to the sub-signals traveling through those legs. But the structure can also introduce phase shifts in the sub-signal traveling through leg 104A by placing the electrodes 502 and 506B such that they generate a fringing electric field in leg 104A. Alternately, ground electrode 506B may be moved to the far side of leg 104A, as in FIG. 5C.

Other embodiments will be apparent. For example, if N=4, an RF electrode may be located between the second and third legs, with corresponding ground electrodes located between the first and second legs, and between the third and fourth legs, respectively. Alternatively, the ground electrodes may be located outside the first and fourth legs, allowing the RF signal to directly modulate all four legs.

The use of a single RF electrode has several advantages. As will be described below, the modulator 100 achieves the desired performance characteristics because the sub-signals in the transmission legs 104 have the correct phase and amplitude relationship to each other to cancel unwanted signals and reinforce desired signals. If more than one RF electrode is used, then the multiple RF electrodes and their corresponding drive circuits will have to be closely matched. Otherwise, the desired phase and amplitude relationships may be upset, particularly if the modulator 100 is used over a wide frequency range. As a result, modulators 100 which only use a single RF electrode avoid this matching problem and typically result in less stringent design and manufacturing requirements and can be operated over wider frequency ranges.

It may also be desirable for the RF coupling efficiency in each leg 104 to be different. This may be accomplished in a number of ways. For example, the RF and ground electrodes may be placed asymmetrically about the legs 104A–C, resulting in an unbalanced push/pull arrangement. Alternately, referring to FIG. 5A, RF signals of different strengths may be applied to RF electrodes 502 and 504. Or RF signals of the same strength may be applied to the RF electrodes, but the applied signals could then be attenuated differently within the RF electrodes.

Referring again to FIG. 1, the two phase-shifting sections 108 and 110 are shown as separate and have been described separately for purposes of clarity. However, in some embodiments, they may be implemented together as a single section. Combining the two phase-shifting sections 108 and 110 generally will result in a more manufacturable modulator 100; while separating the RF and DC sections 108 and 110 typically will improve the bandwidth and in-phase and amplitude flatness of the RF phase-shifting section 108. The order of the DC and RF phase-shifting sections 108 and 110 is also not limited to that shown in FIG. 1.

Figure 6:
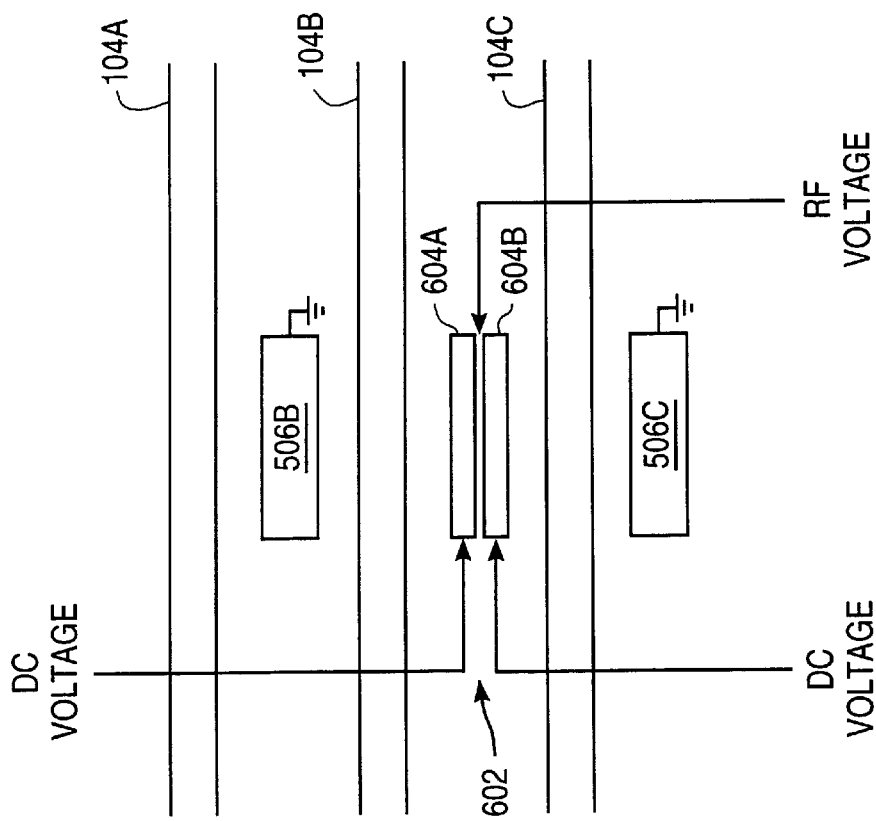
FIG. 6 is a diagram of an embodiment combining DC phase shifting section 110 and RF phase shifting section 108 using a split electrode.

FIG. 6 is a diagram of an embodiment combining DC phase shifting section 110 and RF phase shifting section 108 using a single split electrode 602. This implementation of combined section 109 is identical in architecture to that shown in FIG. 5B, except that RF electrode 504 is replaced by split electrode 602. Ground electrodes 506B and 506C are located in the same positions. The split electrode 602 consists of two parts 604A–B which are located close enough to each other that they exhibit significant coupling at RF frequencies but far enough away so that they are electrically isolated at DC frequencies. In other words, the split electrode 602 behaves like a single electrode at RF frequencies and two separate electrodes at DC frequencies. By applying an RF signal and two separate DC signals to the split electrode 602, the combined section 109 can achieve both the RF and DC phase-shifting functions. At RF frequencies, the combined section 109 is equivalent to the RF phase-shifting section 108 of FIG. 5B. At DC frequencies, part 604A applies one DC voltage across leg 104B, part 604B applies a different DC voltage across leg 104C, and leg 104A is used as reference. The net effect is similar to that achieved by the DC phase-shifting section of FIG. 4.

In FIGS. 5 and 6, the various electrodes are depicted as rectangular in shape and located in a region where the waveguides 104 are running parallel to one another. As with the DC electrodes of FIG. 4, FIGS. 5 and 6 only show a portion of the electrodes and other embodiments will be apparent.

Both the RF and DC phase-shifting sections 108 and 110 are preferably implemented on lithium niobate substrates. In this preferred implementation, the transmission legs 104 would be implemented as waveguides in the substrate, and the RF and DC phase-shifting sections 108 and 110 would include electrodes for applying electric fields across the electro-optic waveguides. The invention, however, is not limited to this implementation. For example, the modulator 100 could be implemented using electro-optic polymer technology. The transmission legs 104 could be implemented as polymer waveguides; RF or DC electrodes could be placed directly above the waveguides by using a cladding layer between the waveguide and the electrode; and a ground plane could be situated below the waveguide again separated by a cladding layer.

The combining section 106 is generally the inverse of the splitting section 102. For example, the combining section 106 could be implemented by using any of the architectures shown in FIGS. 3A–C above but in reverse.

Figure 7:
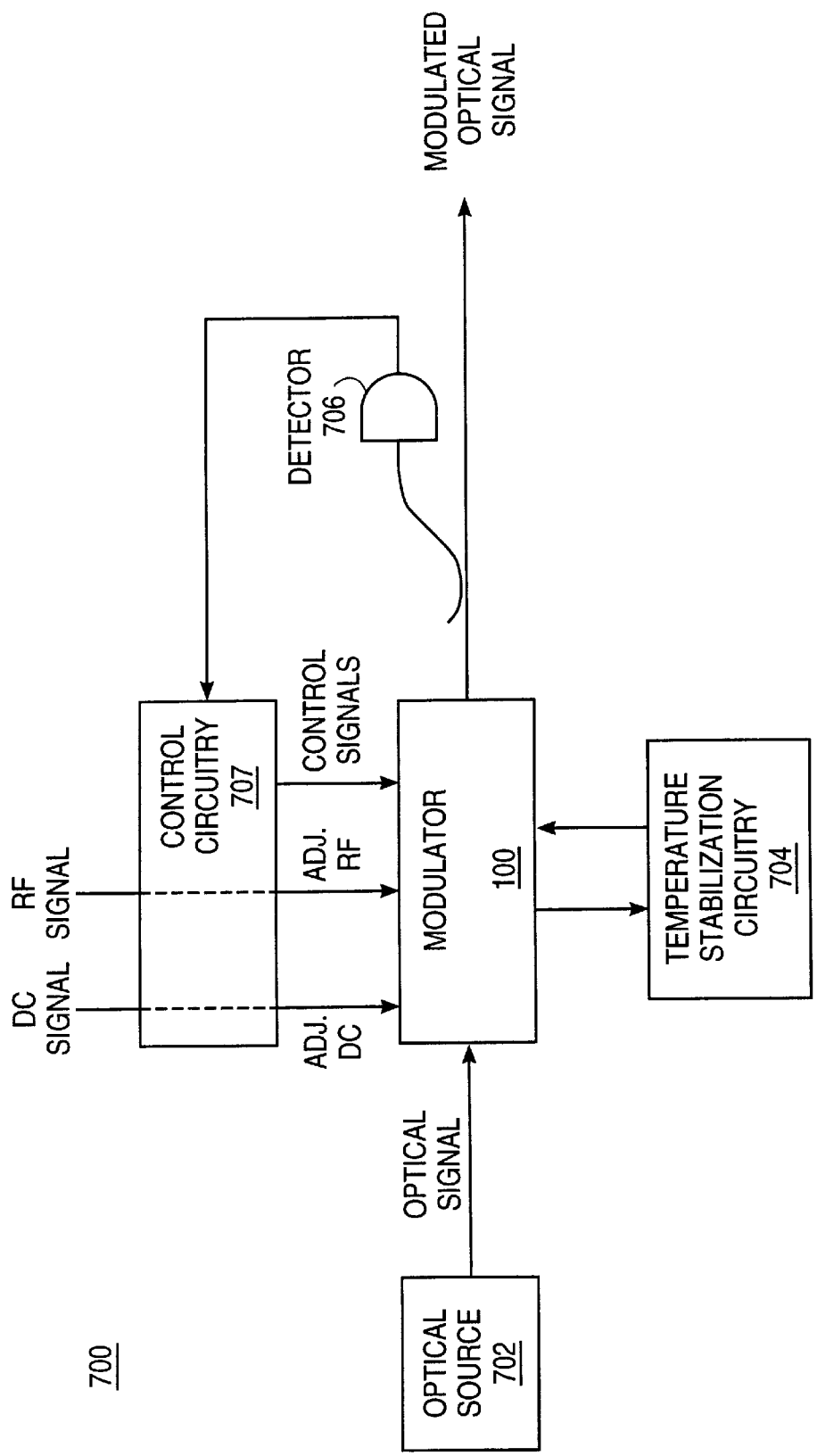
FIG. 7 is a block diagram of a modulator system including modulator 100 of FIG. 1.

FIG. 7 is a block diagram of a modulator system 700 including modulator 100 of FIG. 1. The system 700 further includes an optical source 702, temperature stabilization circuitry 704, photodetector 706, and control circuitry 707. Here, as is the case throughout this description, the term "circuitry" is not meant to be limited to electronic or electrical circuit elements. For example, the control circuitry 707 may also contain optical or electro-optic components.

The optical source 702, preferably a laser source, provides the optical signal received by modulator 100. The laser source could be a solid state device like a high power Nd:YAG laser for long distance transmission or a semiconductor device such as a laser diode for high data/signal transmission by wavelength division multiplexing. In one embodiment, the source 702 further includes an external electro-optic phase modulator located between the laser and the modulator 100, in order to broaden the linewidth of the laser source to reduce the effect of Stimulated Brillouin Scattering in long distance fiber optic communication. Such a phase modulator may be located at other positions, such as directly after the modulator 100, and still achieve the same purpose. Alternatively, the optical source could have an internal frequency modulation capability or the optical source could be slightly amplitude modulated.

Temperature stabilization circuitry 704 is coupled to modulator 100 in order to stabilize the temperature of modulator 100 according to standard temperature stabilization techniques. Stabilizing the modulator 100's temperature will also help stabilize its operation. For example, temperature fluctuations can result in path length fluctuations in the transmission legs 104, thus upsetting the relative phase and amplitude relationships between the various legs 104.

Operating point stability for the modulator is further improved by a feedback loop formed by the photodetector 706 and control circuitry 707. The photodetector 706 is coupled to the output of modulator 100 in order to sample its output. Control circuitry 707 receives the sampled output, analyzes it, and correspondingly adjusts the incoming RF and DC signals, as well as modulator 100. The adjusted RF and DC signals and control signals for modulator 100 are then input to the modulator 100.

Various types of feedback loops are possible. In one particular embodiment, control circuitry 707 adds two pilot tones to the incoming RF signal. The modulator 100 thus receives the original RF signal plus the pilot tones. Detector 706 detects the modulated version of this. Control circuitry 707 isolates the effects from the pilot tones by, for example, narrowband filtering the detected signal. By analyzing the intermodulation products generated by the pilot tones, control circuitry 707 can output appropriate control signals for controlling modulator 100. For example, if the optical path lengths through any of the transmission legs 104 is drifting, the control circuitry 707 can compensate by adjusting the DC signals input to modulator 100. If comparison to the incoming RF signals indicates that the RF coupling efficiency is drifting, the control circuitry 707 can compensate by adjusting the strength of the RF signals input to the modulator 100. If the splitting ratios are wandering, the control signals from control circuitry 707 might adjust the ratios if modulator 100 has a dynamically adjustable splitting section. In alternative embodiments, other than two pilot tones may be used, or the pilot tones may be added to the incoming DC signal instead.

Principle of Operation

Figure 8:
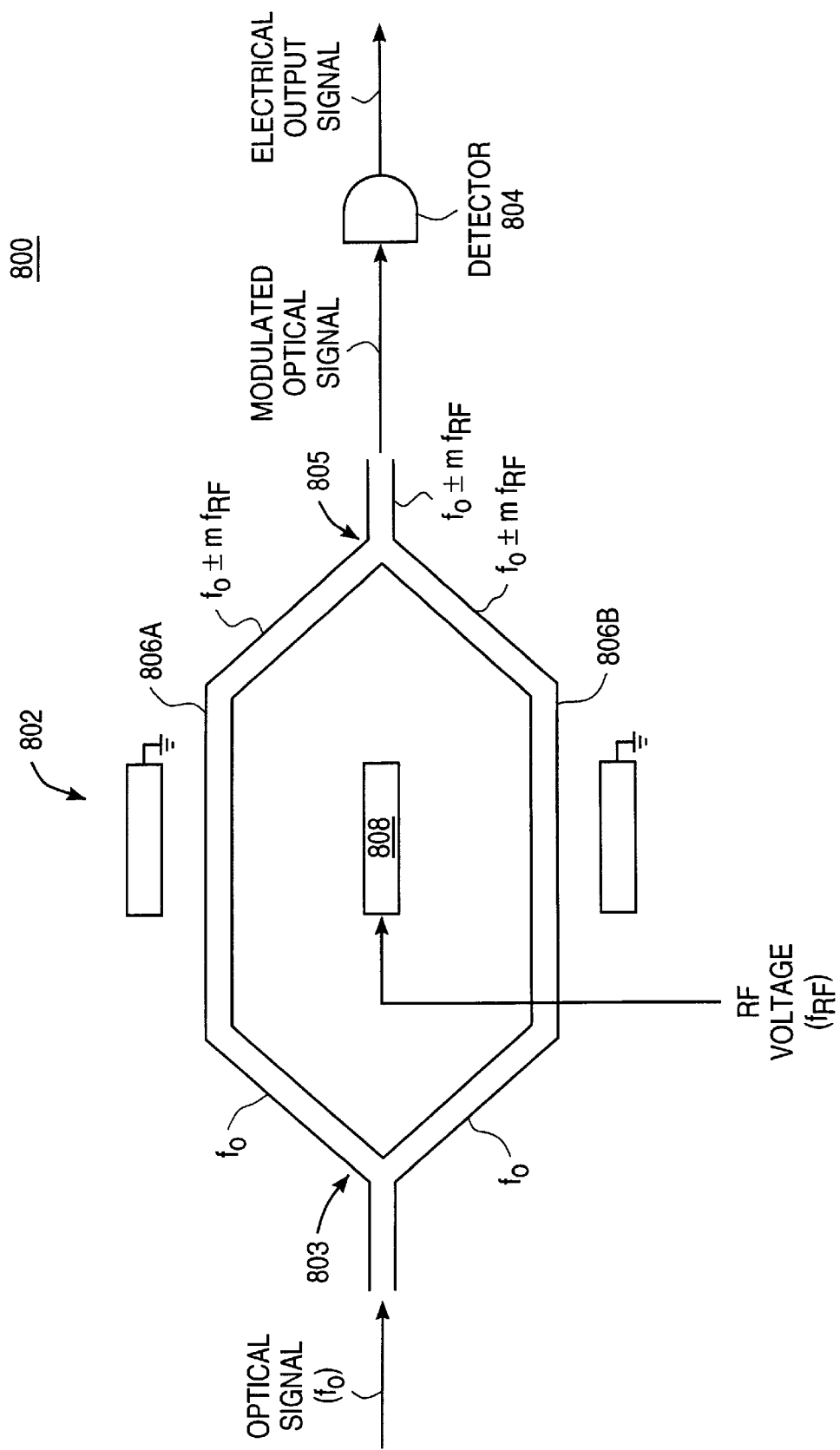
FIG. 8 (prior art) is a diagram of a system including a Mach-Zehnder modulator and a photodetector.

To further understand the operation of modulator 100, it is instructive to first consider a standard system 800 including a Mach-Zehnder modulator (MZM) 802 and a photodetector 804, as shown in FIG. 8 (prior art). The MZM 802 includes two transmission legs 806A–B and an RF electrode 808 positioned to modulate both legs 806. The system 800 operates as follows. The MZM 802 receives an optical signal at optical frequency $f_o$. This signal is split by splitting section 803 into two sub-signals, one for each leg 806 with each sub-signal still at frequency $f_o$. An RF signal of frequency $f_{RF}$ is received by RF electrode 808 (assume that the RF signal is a sinusoid for purposes of this discussion). This RF signal phase-modulates each of the sub-signals in legs 806. The modulation, however, is a phase modulation, meaning that the phase of each modulated sub-signal now includes a sinusoidal component at frequency $f_{RF}$. Hence, the frequency spectrum of the resulting modulated sub-signal includes components at the frequencies $f_o \pm m\, f_{RF}$, where m is an integer, since the sinusoidal phase creates a Bessel function expansion around the optical carrier frequency $f_o$. When the sub-signals are coherently combined in combining section 805, the frequency spectrum of the resulting modulated signal will still only have components at the frequencies $f_o \pm m\, f_{RF}$. The modulated signal is detected by detector 804 to produce an electrical output signal. The photodetector 804, however, is nonlinear (e.g., commonly a square law detector) so the frequency spectrum of the electrical output signal will contain beat products of the frequency components in the modulated optical signal. For example, the output electrical signal at frequency $f_{RF}$ is generated by the addition of the beat products which result from mixing the components at (a) ($f_o-2\, f_{RF}$) and ($f_o-f_{RF}$), (b) ($f_o-f_{RF}$) and $f_o$, (c) $f_o$ and ($f_o+f_{RF}$), (d) ($f_o+f_{RF}$) and ($f_o+2\, f_{RF}$), etc. Similarly, the electrical output signal at the second harmonic $2\, f_{RF}$ is generated by the addition of the beat products which result from mixing the components at (a) ($f_o-2\, f_{RF}$) and $f_o$, (b) ($f_o-f_{RF}$) and ($f_o+f_{RF}$), (c) $f_o$ and ($f_o+2\, f_{RF}$), etc.

Modulator 100 operates analogously to the MZM 802, except for the significant difference that the various beat products combine in a manner which results in the desired performance characteristic. For example, assume that a certain application required the elimination of the third order term (i.e., the electrical output signal at frequency $3\, f_{RF}$). Referring again to FIG. 6, in section 109 of FIG. 6, the RF signal modulates the optical sub-signals in legs 104B and 104C, but not in leg 104A. The sub-signals in the two modulated legs 104B–C would contain components at frequencies $f_o \pm m\, f_{RF}$; while the sub-signal in the third non-modulated leg 104A would only have a single frequency component at the optical frequency $f'_o = f_o$ where the prime is used to distinguish the signal produced by the third leg from the signal of the same frequency produced by the first two legs. The modulator 100 might be designed so that the sub-signal produced by the third leg 104A had the proper phase and amplitude to generate additional third order mixing terms at the photodetector that exactly canceled out the third order terms generated by the other two legs 104B–C. Specifically, the two modulated legs 104B–C would produce a third order term which results from mixing the components at (a) ($f_o-3\, f_{RF}$) and $f_o$, (b) ($f_o-2\, f_{RF}$) and ($f_o+f_{RF}$), (c) ($f_o-f_{RF}$) and ($f_o+2f_{RF}$), (d) $f_o$ and ($f_o+3\, f_{RF}$), etc. The additional third order term generated by the third leg 104A results from mixing the components at (a) $f'_o$ and ($f_o-3\, f_{RF}$), and (b) $f'_o$ and ($f_o+3\, f_{RF}$). If this additional term was of equal amplitude and 180 degrees out of phase with the term generated by the two modulated legs, then the third order will be eliminated as desired. The various design parameters, such as splitting ratio, DC phase shift, RF coupling efficiency, etc., are selected to accomplish this objective, as will be described below.

The use of three or more legs in modulator 100 results in significant advantages over the conventional MZM shown in FIG. 8. Modulator 100 has more design degrees of freedom than standard MZM 108. As a result, there is more flexibility in tailoring the relative magnitudes and phases of the various frequency components in modulated legs 104B–C and also in controlling the mixing of the various frequency components from all three legs 104. This, in turn, allows modulator 100 to be tailored for specific harmonic performances which cannot be achieved by conventional MZM 108, such as the elimination of the third order term in the example given above.

Design Selection

Different applications will impose different requirements on the performance characteristics of the modulator 100 and overall optical link. In the above example, the desired performance characteristic was the elimination of the third order term. In the distribution of cable television, the desired performance characteristic might be the reduction of intermodulation distortion products while maximizing signal to noise ratio. Maximizing carrier to noise ratio might be another desired characteristic. The method of selecting the design parameters will be discussed below in the context of specific performance characteristics, but the invention is not limited to the example performance characteristics disclosed.

Figure 9:
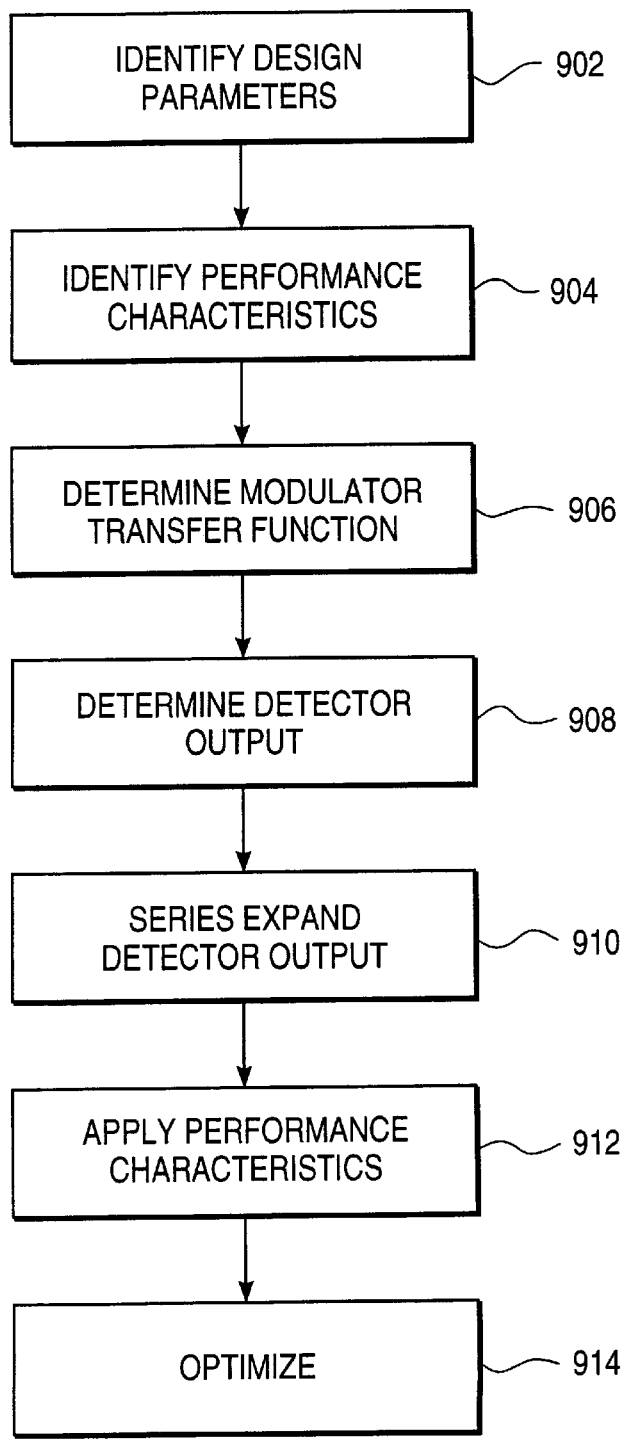
FIG. 9 is a flow diagram illustrating a preferred method 900 for selecting design parameters.

FIG. 9 is a flow diagram illustrating a preferred method 900 for selecting design parameters. The steps are shown in FIG. 9 in a specific order, but, as will be apparent below, the method 900 does not require that the various steps be completed in the order shown. The method 900 will be illustrated by example, using the modulator 100A shown in FIG. 10, but is not limited to this specific example. Modulator 100A of FIG. 10, in turn, is used to illustrate the method 900 but does not represent the only modulator achievable by the method 900.

Figure 10:
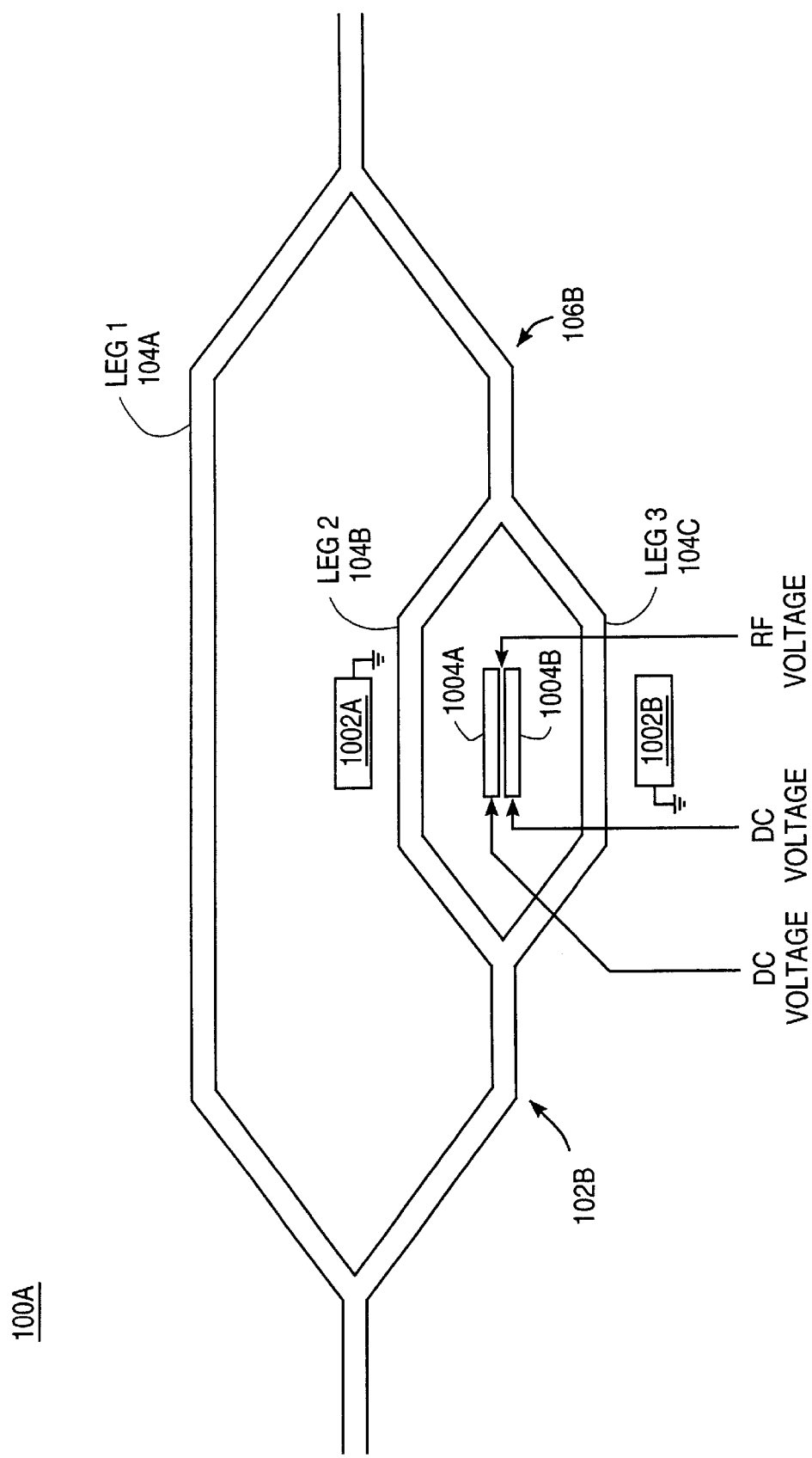
FIG. 10 is a diagram illustrating an example modulator used to illustrate method 900 of FIG. 9.

In step 902 of method 900, the various design parameters for the modulator are identified. In the example of FIG. 10, the modulator 100A is selected to be an N=3 modulator (i.e., the modulator has three transmission legs) with splitting and combining sections 102B and 106B as in FIG. 3B. In addition, no RF voltage is applied to leg 104A, and legs 104B–C form a MZM but with asymmetric RF coupling coefficients implemented by split electrode portions 1004A–1002A and 1004B–1002B. DC voltages are applied to legs 104B and 104C by split electrode portions 1004A–1002A and 1004B–1002B, respectively; leg 1 is used as the DC reference. The various design parameters roughly correspond to the degrees of freedom discussed in conjunction with FIG. 1—splitting ratio, DC phase shift, RF coupling efficiency, and combining ratio—but are selected to have a more direct correspondence with the physical implementation of modulator 100A. However, rather than listing all of the design parameters at this point, they will be introduced as necessary and then listed in their entirety once all design parameters have been introduced. Design parameters will be identified by the symbols "xn", where "x" is a symbol identifying the quantity and "n" is a number (1, 2, or 3) identifying the relevant transmission leg (104A, B, or C). For example, Vb2 is the bias voltage ("Vb") applied to the DC electrode for leg 104B.

In step 904, the performance characteristics are identified. For this example, assume the following performance characteristics which may be used with frequency shifted cable television distribution systems:

1. Maximize signal to noise ratio.
2. 3rd and 5th order terms of the electrical output are zero.
3. Cumulative 7th order spur to signal power in the 4 MHz channel passband is less than −65 dBc.
4. RF signal consists of 80 carrier tones.

In step 906, the modulator's transfer function is determined as a function of the design parameters. Here, the total electric field at the output of the modulator is given by $$Eo = E1 + E2 + E3$$

where En is the electric field of the sub-signal in leg n after being phase-shifted by the DC and RF phase shifting sections. En can be expanded as En=$b_n$ $c_n$ Ei cos [$\omega_c$ t+$\phi_{sn}$+$\theta_n$], where $b_n^2$=power coupled into leg n/power received at modulator input;

$b_n^2$ $c_n^2$=power coupled to the modulator output from leg n/power received at modulator input;

Ei=electric field at the input of the modulator;

$\omega_c$=carrier frequency of the optical signal;

$\phi_{sn}$=phase shift of sub-signal n due to the DC and RF signals; and $\theta_n$=phase shift of sub-signal n due to optical path length of leg n.

The design parameters $b_n$ and $c_n$ are related to the splitting ratio and combining ratio, respectively. Conservation of energy results in the conditions $b1^2 + b2^2 + b3^2 \leq 1$ and $c1^2 + c2^2 + c3^2 \leq 1$.

In addition, the phase shifts $\phi_{sn}$ may be expanded as $\phi_{sn} = \alpha_n (g_n V(t) + V_{bn})$, where $\alpha_n$=electro-optic coefficient for leg n;

$g_n$=electrical gain for RF circuitry for leg n;

V(t)=RF voltage applied to modulator (same for all legs in this case); and

Vbn=DC bias voltage applied to leg n.

In this particular example, g1=0 since no RF voltage is applied to leg 1. In addition, g2=g3, since the same RF signal is applied to both parts of split electrode 1004. But $\alpha_2 \neq \alpha_3$ since legs 2 and 3 are arranged in an asymmetric MZM configuration.

In step 908, the output of the photodetector is determined. Here, the detector is a square law device so the corresponding photocurrent is:

Ip=$\eta$L $Eo^2$, where $\eta$=responsivity of the detector; and

L=factor accounting for optical loss.

Substituting equations for Eo then yields $Ip = \eta P L$ [$b1^2$ $c1^2 + b2^2$ $c2^2 + b3^2$ $c3^2$ +2 $b1$ $b2$ $c1$ $c2$ cos [$\alpha1$ ($g1$ $V(t)+Vb1$)−$\alpha2$ ($g2$ $V(t)+Vb2$)+$\theta1$−$\theta2$]

+2 $b1$ $b3$ $c1$ $c3$ cos [$\alpha1$ ($g1$ $V(t)+Vb1$)−$\alpha3$ ($g3$ $V(t)+Vb3$)+$\theta1$−$\theta3$]

+2 $b2$ $b3$ $c2$ $c3$ cos [$\alpha2$ ($g2$ $V(t)+Vb2$)−$\alpha3$ ($g3$ $V(t)+Vb3$)+$\theta2$−$\theta3$]], where P is the optical power received at the modulator input.

In step 910, the detector output is expanded in a series. Here, the photocurrent Ip will be expressed in the form Ip=a0+a 1 V(t)+$\Sigma$ aj fj (t), where fj(t)=functions used for the series expansion;

aj=coefficients for the series expansion; and the summation is for j=2 to infinity. The coefficients aj will generally be functions of the design parameters bn, cn, $\alpha_n$, $\theta_n$, gn, and Vbn. In this example, the fj(t) are chosen to yield a power series expansion of Ip, although other choices of fj(t), such as Bessel functions or Fourier series, may be used.

In the power series expansion, $fj(t) = V(t)^j$

Equating the power series expression for Ip with the derived expression for Ip yields the coefficients aj as follows:

$aj = [2\eta P L (-1)^{(j+1)/2}/j!]$

[($b1$ $b2$ $c1$ $c2$ ($g1$ $\alpha1 - g2$ $\alpha2$)$^j$ sin($Vb1$ $\alpha1 - Vb2$ $\alpha2 + \theta1 - \theta2$)

+($b1$ $b3$ $c1$ $c3$ ($g1$ $\alpha1 - g3$ $\alpha3$)$^j$ sin($Vb1$ $\alpha1 - Vb3$ $\alpha3 + \theta1 - \theta3$)

+($b2$ $b3$ $c2$ $c3$ ($g2$ $\alpha2 - g3$ $\alpha3$)$^j$ sin($Vb2$ $\alpha2 - Vb3$ $\alpha3 + \theta2 - \theta3$)]

for j=positive odd integers;

$aj = [2 \eta P L (-1)^{j/2}/j!]$

[($b1$ $b2$ $c1$ $c2$ ($g1$ $\alpha1 - g2$ $\alpha2$)$^j$ cos($Vb1$ $\alpha1 - Vb2$ $\alpha2 + \theta1 - \theta2$)

+($b1$ $b3$ $c1$ $c3$ ($g1$ $\alpha1 - g3$ $\alpha3$)$^j$ cos($Vb1$ $\alpha1 - Vb3$ $\alpha3 + \theta1 - \theta3$)

+($b2$ $b3$ $c2$ $c3$ ($g2$ $\alpha2$"$g3$ $\alpha3$)$^j$ cos($Vb2$ $\alpha2 - Vb3$ $\alpha3 + \theta2 - \theta3$)]

for j=non zero positive even integers; and $a0 = \theta P L$ [$b1^2$ $c1^2 + b2^2$ $c2^2 + b3^2$ $c3^2$ +2 $b1$ $b2$ $c1$ $c2$ cos($Vb1$ $\alpha1 - Vb2$ $\alpha2 + \theta1 - \theta2$)

$+2\ b1\ b3\ c1\ c3\ \cos(Vb1\ \alpha1-Vb3\ \alpha3+\theta1-\theta3)$ $+2\ b2\ b3\ c2\ c3\ \cos(Vb2\ \alpha2-Vb3\ \alpha3+\theta2-\theta3)]$.

In step 912, the performance characteristics are applied to the derived expressions. Here, the 3rd and 5th order terms are constrained to be zero, so a3 and a5 are both set to 0. Similarly, applying the 7th order spur constraint results in an inequality bounding the value of a7. The remaining constraint concerns the signal to noise ratio (SNR).

The signal is just V(t). The noise contains both optical noise and electronic noise. The electronic noise comes from the optical receiver and the optical noise contains mainly the quantum and intensity noise of the optical signal impinging onto the photodetector. Thus, $SNR=[a1^2\ \underline{V^2}]/[2\ e\ \underline{I_D}+\text{Intensity Noise+Receiver Noise}]$ where the underbar is used to indicate the time-averaged value. Since the signal is a multi-tone signal, $V(t)=\Sigma Vk\ \sin[\omega k\ t+\chi k]$, where the Vk are independent random variables, ωk and χk are the carrier frequency and phase of the kth tone, respectively, and the summation is over the index k=1 to 80, the number of tones.

In step 914, the performance characteristics are optimized. Here, the SNR given above is maximized, subject to the constraints on a3, a5 and a7 described above, and also subject to the conservation of energy constraints on the bn and cn. This can be done using standard computer programs that are capable of solving and/or optimizing coupled nonlinear equations with conditions. The optimization yields a number of possible solutions (i.e., local optima), a preferred one of which is the following:

$\delta=0.38$ $b1^2=0.48,\ b2^2=0.05,\ b3^2=0.47$ $c1^2=0.48,\ c2^2=0.05,\ c3^2=0.47$ $\gamma1=-79$ degrees $\gamma2=-90$ degrees, where $\gamma1=Vb2\ \alpha2-Vb1\ \alpha1+\theta2-\theta1$;

$\gamma2=Vb3\ \alpha2\ 67\ -Vb1\ \alpha1+\theta3-\theta1$; and $\delta=\alpha3/\alpha2$.

γ1 is the DC phase shift between leg 2 and leg 1, accounting for phase shifts due to the DC bias voltage and inherent differences in path length through the legs but not due to the RF signal. γ2 is the same quantity, but between legs 3 and 1.

In this example, there were eighteen parameters (bn, cn, αn, θn, gn, and Vbn), some of which are not controllable (e.g., θn), some of which are not fully independent (e.g., bn and cn), and some of which were constrained by the chosen design (e.g., g1=0). As a result there are fewer than eighteen degrees of freedom. In this example, there were also three constraints on the coefficients a3, a5 and a7, two coupling conditions on bn and cn, and a constraint to maximize the SNR. Various other combinations of constraints and design degrees of freedom may be used. For example, some systems may require elimination of the second order term, or elimination of the second and third order terms.

Figure 11:
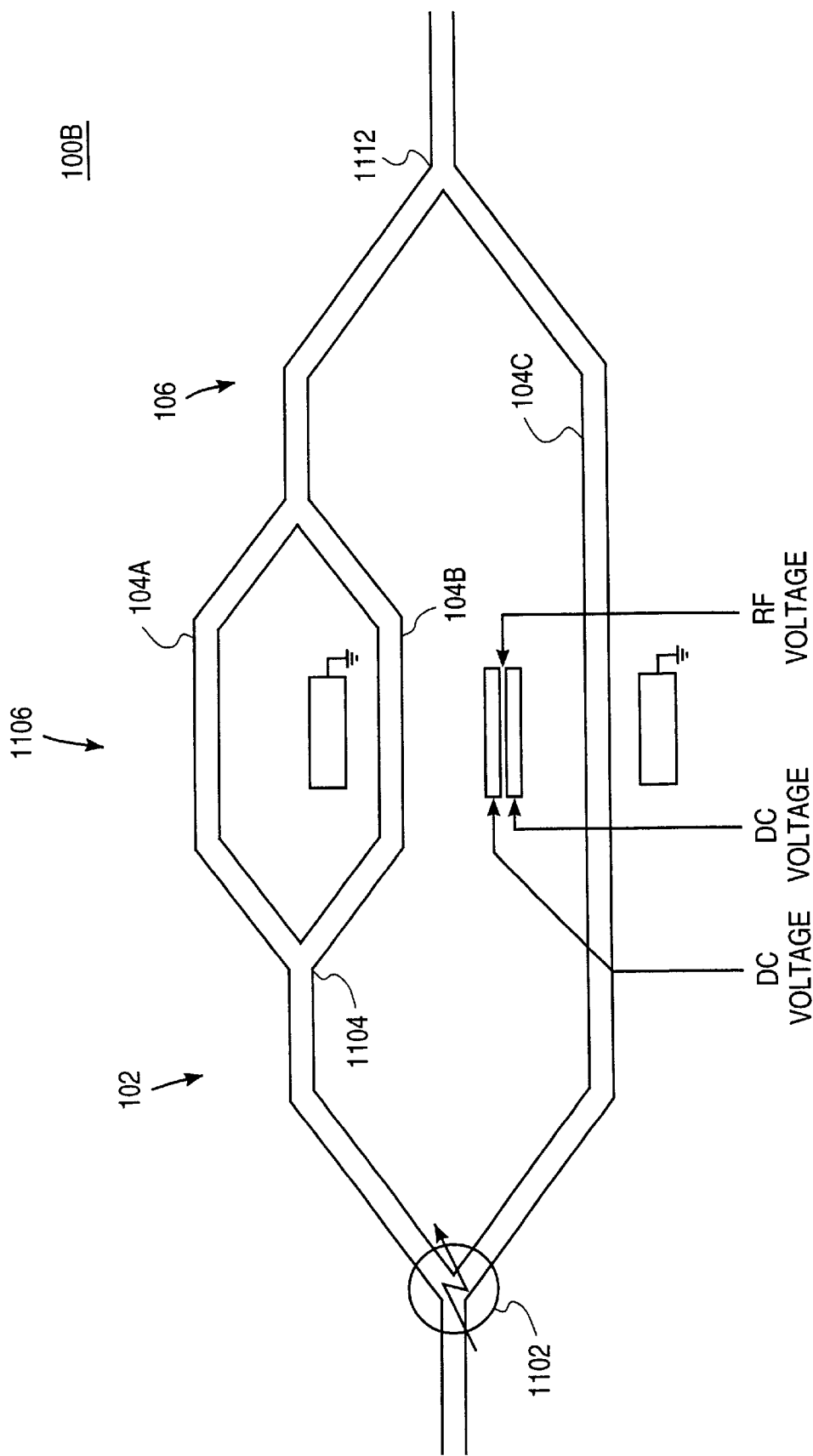
FIG. 11 is a diagram of an alternate embodiment of modulator 100 of FIG. 1.

For example, FIG. 11 is a diagram of an alternate embodiment of modulator 100 of FIG. 1. In this embodiment, the splitting section 102 is implemented as an adjustable 2×2 coupler 1102 followed by a standard Y splitter 1104. The adjustable coupler 1102 may be adjusted to split from 1–5% of the received optical signal into transmission leg 104C. The remaining power is split equally by Y splitter 1104 between legs 104A–B. The RF and DC phase-shifting sections are implemented as a combined section 1106, using the split electrode configuration of FIG. 6. The relative RF coupling efficiencies into transmission legs 104A–C are 0:54:100, respectively. The combining section 106 is the reverse of splitting section 102, except that the final 2:1 combiner 1112 is not adjustable but is fixed at 2%. The adjustable coupling efficiency allows the modulator 100B to be used for different performance characteristics. For example, the modulator 100B may be optimized for maximum signal power or for maximum ratio of signal to average optical power.

In the case of maximum signal power, $\delta=100:54$ $b1^2=0.49,\ b2^2=0.49,\ b3^2=0.02$ $c1^2=0.49,\ c2^2=0.49,\ c3^2=0.02$ $\gamma1=86$ degrees $\gamma2=-15$ degrees In the case of maximum signal to average optical power, $\gamma=100:54$ $b1^2=0.475,\ b2^2=0.475,\ b3^2=0.05$ $c1^2=0.49,\ c2^2=0.49,\ c3^2=0.02$ $\gamma1=109$ degrees $\gamma2=-46$ degrees.

Although the invention has been described in considerable detail with reference to certain preferred embodiments thereof, other embodiments are possible. Therefore, the scope of the appended claims should not be limited to the description of the preferred embodiments contained herein.

What is claimed is:

1. A modulator system comprising:
   an electro-optic modulator, said electro-optic modulator including:
   a 1:3 splitting section, for splitting a received optical signal into exactly three sub-signals;
   three transmission legs, each leg coupled to receive one of the three sub-signals from the 1:3 splitting section;
   an RF phase-shifting section for phase shifting each of at least two of the three sub-signals by an amount proportional to a received RF signal;
   a DC phase-shifting section for phase shifting each of two of the three sub-signals by a DC phase relative to the third sub-signal; and
   a 3:1 combining section coupled to received the RF phase-shifted and DC phase-shifted sub-signals from the three transmission legs for combining said sub-signals into a modulated optical signal.

2. The modulator system of claim 1 wherein the 1:3 splitting section includes a 3-prong Y junction splitter.

3. The modulator system of claim 1 wherein each transmission leg includes a waveguide containing an electro-optic polymer.

4. The modulator system of claim 1 wherein each transmission leg includes a waveguide and the waveguides are fabricated on a common lithium niobate substrate.

5. The modulator system of claim 1 wherein:
the transmission legs include a first, a second, and a third transmission leg;
the splitting section is characterized by a splitting ratio of first to second to third transmission leg substantially equal to 0.48:0.05:0.47;
the combining section is characterized by a combining ratio of first to second to third transmission leg substantially equal to 0.48:0.05:0.47; and
the RF phase-shifting section is characterized by relative RF coupling efficiencies of first to second to third transmission leg substantially equal to 0.0:1.0:−0.38.

6. The modulator system of claim 1 wherein:
the transmission legs include a first, a second, and a third transmission leg;
the splitting section is characterized by a splitting ratio of first to second to third transmission leg substantially equal to 0.49:0.49:0.02;
the combining section is characterized by a combining ratio of first to second to third transmission leg substantially equal to 0.49:0.49:0.02; and
the RF phase-shifting section is characterized by relative RF coupling efficiencies of first to second to third transmission leg substantially equal to 0.0:1.0:0.54.

7. The modulator system of claim 1 wherein:
the transmission legs include a first, a second, and a third transmission leg;
the splitting section is characterized by a splitting ratio of first to second to third transmission leg substantially equal to 0.475:0.475:0.05;
the combining section is characterized by a combining ratio of first to second to third transmission leg substantially equal to 0.49:0.49:0.02; and
the RF phase-shifting section is characterized by relative RF coupling efficiencies of first to second to third transmission leg substantially equal to 0.0:1.0:0.54.

8. The modulator system of claim 7 wherein the splitting ratio is adjustable over a range of 0.49:0.49:0.02 to 0.475:0.475:0.05.

9. The modulator system of claim 1 further comprising an optical source coupled to transmit the optical signal to the electro-optic modulator.

10. The modulator system of claim 1 further comprising:
a photodetector coupled to sample the modulated optical signal; and
control circuitry coupled to the photodetector and modulator for receiving the sampled
signal and responsive to the sampled signal, providing to the modulator a signal
from the group consisting of:
at least one adjusted DC signal,
at least one adjusted RF signal, and
control signals for controlling the modulator.

11. The modulator system of claim 10 wherein:
the adjusted RF signal includes at least one pilot tone; and
the control circuitry provides the signal to the modulator responsive to intermodulation products generated by the pilot tones.

12. An electro-optic modulator comprising:
a 1:N splitting section, for splitting a received optical signal into N sub-signals, N greater than or equal to 3, wherein the 1:N splitting section includes an adjustable splitter;
N transmission legs, each leg coupled to receive one of the N sub-signals from the 1:N splitting section;
an RF phase-shifig section for phase shifting at least two of the sub-signals in the N transmission legs by an amount proportional to a received RF signal;
a DC phase-shifting section for phase shifting at least two of the sub-signals in the N transmission legs by a DC phase relative to a reference one of the transmission legs; and
an N:1 combining section coupled to received the RF phase-shifted and DC phase-shifted sub-signals from the N transmission legs for combining said sub-signals into a modulated optical signal.

13. A modulator system comprising:
an optical source for producing an optical signal;
an electro-optic modulator coupled to the optical source for modulating the optical signal, said electro-optic modulator including:
a 1:N splitting section, for splitting the optical signal into N sub-signals, N greater than or equal to 3;
N transmission legs, each leg coupled to receive one of the N sub-signals from the 1:N splitting section;
an RF phase-shifting section for phase shifting at least two of the sub-signals in the N transmission legs by an amount proportional to a received RF signal;
a DC phase-shifting section for phase shifting at least two of the sub-signals in the N transmission legs by a DC phase relative to a reference one of the transmission legs; and
an N:1 combining section coupled to received the RF phase-shifted and DC phase-shifted sub-signals from the N transmission legs for combining said sub-signals into a modulated optical signal; and
linewidth broadening means for broadening a linewidth of the optical signal.

14. A modulator system comprising:
an electro-optic modulator, said electro-optic modulator including:
a 1:N splitting section, for splitting a received optical signal into N sub-signals, N greater than or equal to 3;
N transmission legs, each coupled to receive one of the N sub-signals from the 1:N splitting section, at least two of the transmission legs including electro-optic material;
exactly one RF electrode for receiving an RF signal to create RF electric fields in the electro-optic material of at least two of the transmission legs, whereby the sub-signal in said transmission legs are phase shifted by an amount proportional to said RF signal; and
an N:1 combining section coupled to received the RF phase-shifted sub-signals from the N transmission legs for combining said sub-signals into a modulated optical signal.

15. The modulator system of claim 14 wherein the exactly one RF electrode is a split electrode.

16. The modulator system of claim 14 wherein:
N=3;
the electro-optic modulator further includes first and second ground electrodes;
the transmission legs include first, second, and third substantially straight waveguides, the waveguides placed in parallel to each other, the second waveguide located between the first and third waveguides;
the RF electrode is located in part between the second and third waveguides, the second waveguide is located in part between the first ground electrode and the RF electrode, and the third waveguide is located in part between the RF electrode and the second ground electrode.

17. The modulator system of claim 14 wherein:

N=3;

the electro-optic modulator further includes first and second ground electrodes;

the transmission legs include first, second, and third substantially straight waveguides, the waveguides placed in parallel to each other, the second waveguide located between the first and third waveguides; and the RF electrode is located in part between the second and third waveguides, the first and second waveguides are located in part between the first ground electrode and the RF electrode, and the third waveguide is located in part between the RF electrode and the second ground electrode.

18. The modulator system of claim 14 wherein:

N=4;

the electro-optic modulator further includes first and second ground electrodes;

the transmission legs include first, second, third, and fourth substantially straight waveguides, the waveguides placed in parallel to each other, the second waveguide located between the first and third waveguides, and the third waveguide located between the second and fourth waveguides; and the RF electrode is located in part between the second and third waveguides, the first and second waveguides are located in part between the first ground electrode and the RF electrode, and the third and fourth waveguides are located in part between the RF electrode and the second ground electrode.

19. The modulator system of claim 14 wherein:

N=4;

the electro-optic modulator further includes first and second ground electrodes;

the transmission legs include first, second, third, and fourth substantially straight waveguides, the waveguides placed in parallel to each other, the second waveguide located between the first and third waveguides, and the third waveguide located between the second and fourth waveguides; and the RF electrode is located in part between the second and third waveguides, the second waveguide is located in part between the first ground electrode and the RF electrode, and the third waveguide is located in part between the RF electrode and the second ground electrode.

20. The modulator system of claim 14 wherein the electro-optic modulator further comprises a DC phase-shifting section for phase shifting at least two of the sub-signals in the N transmission legs by a DC phase relative to a reference one of the transmission legs.

21. A method for modulating an optical signal comprising:

receiving an optical signal;

splitting the received optical signal into exactly three sub-signals;

phase shifting each of at least two of the three sub-signals by an amount proportional to a received RF signal;

phase shifting each of at least two of the three sub-signals by a DC phase relative to the third sub-signal; and combining the RF phase-shifted and DC phase-shifted sub-signals into a modulated optical signal.

22. The method of claim 21 wherein:

phase shifting the sub-signals by the amount proportional to the received RF signal includes:
receiving an RF voltage, and
causing the RF voltage to introduce a phase shift in the sub-signals proportional in amount to said RF voltage; and phase shifting the sub-signals by the DC phase includes:
receiving a DC voltage, and
causing the DC voltage to introduce a DC phase shift in the sub-signals proportional to said DC voltage.

23. The method of claim 22 wherein receiving the RF voltage includes receiving the RF voltage at a single location.

24. The method of claim 21 wherein:

splitting the received optical signal into exactly three sub-signals includes splitting the optical signal into a first, a second, and a third sub-signal according to a splitting ratio substantially equal to 0.48:0.05:0.47;

phase shifting the sub-signals by the amount proportional to the received RF signal includes phase shifting according to relative RF coupling efficiencies of first to second to third sub-signals substantially equal to 0.0:1.0:−0.38;

phase shifting the sub-signals by the DC phase includes phase shifting the second and third sub-signals by amounts substantially equal to −79 and −90 degrees relative to the first sub-signal; and combining the RF phase-shifted and DC phase-shifted sub-signals includes combining said sub-signals according to a combining ratio of first to second to third sub-signal substantially equal to 0.48:0.05:0.47.

25. The method of claim 21 wherein:

splitting the received optical signal into three sub-signals includes splitting the optical signal into a first, a second, and a third sub-signal according to a splitting ratio substantially equal to 0.49:0.49:0.02;

phase shifting the sub-signals by the amount proportional to the received RF signal includes phase shifting according to relative RF coupling efficiencies of first to second to third sub-signals substantially equal to 0.0:1.0:0.54;

phase shifting the sub-signals by the DC phase includes phase shifting the second and third sub-signals by amounts substantially equal to 86 and −15 degrees relative to the first sub-signal; and combining the RF phase-shifted and DC phase-shifted sub-signals includes combining said sub-signals according to a combining ratio of first to second to third sub-signal substantially equal to 0.49:0.49:0.02.

26. The method of claim 21 wherein:

N=3;

splitting the received optical signal into N sub-signals includes splitting the optical signal into a first, a second, and a third sub-signal according to a splitting ratio substantially equal to 0.475:0.475:0.05;

phase shifting the sub-signals by the amount proportional to the received RF signal includes phase shifting according to relative RF coupling efficiencies of first to second to third sub-signals substantially equal to 0.0:1.0:0.54;

phase shifting the sub-signals by the DC phase includes phase shifting the second and third sub-signals by amounts substantially equal to 109 and −46 degrees relative to the first sub-signal; and combining the RF phase-shifted and DC phase-shifted sub-signals includes combining said sub-signals according to a combining ratio of first to second to third sub-signal substantially equal to 0.49:0.49:0.02.

27. The method of claim 21 further comprising:

sampling the modulated optical signal; and responsive to the sampled signal, performing a task from the group consisting of:
adjusting the DC phase,
adjusting the received RF signal, and
adjusting a splitting ratio characterizing the splitting; and
adjusting a combining ratio characterizing the combining.

28. The method of claim 27 wherein:

the method further comprises adding at least one pilot tone to the received RF signal; and performing the task includes performing said task responsive to intermodulation products generated by the pilot tones.

29. A method for modulating an optical signal comprising:

receiving an optical signal;

adiustably splitting the received optical signal into N sub-signals, N greater than or equal to 3;

phase shifting at least two of the sub-signals by an amount proportional to a received RF signal;

phase shifting at least two of the sub-signals by a DC phase relative to a reference sub-signal; and combining the RF phase-shifted and DC phase-shifted sub-signals into a modulated optical signal.

30. A method for modulating an optical signal comprising:

receiving an optical signal;

splitting the received optical signal into N sub-signals, N greater than or equal to 3;

broadening a hnewidth of the received optical signal and/or one of the sub-signals;

phase shifting at least two of the sub-signals by an amount proportional to a received RF signal;

phase shifting at least two of the sub-signals by a DC phase relative to a reference sub-signal; and combining the RF phase-shifted and DC phase-shifted sub-signals into a modulated optical signal.

31. A method for designing an electro-optic modulator, wherein the modulator includes a 1:N splitting section for splitting a received optical signal into N sub-signals, N greater than or equal to 3; N transmission legs, each leg coupled to receive one of the N sub-signals from the 1:N splitting section; an RF phase-shifting section for phase shifting at least two of the sub-signals by an amount proportional to a received RF signal; a DC phase-shifting section for phase shifting at least two of the subsignals by a DC phase relative to a reference one of the sub-signals; and an N:1 combining section coupled to received the RF phase-shifted and DC phase-shifted sub-signals for combining said sub-signals into a modulated optical signal; the method comprising:

selecting a desired harmonic performance for an output of a system including the electro-optic modulator;

identifying design parameters for the electro-optic modulator;

deriving a mathematical expression which expresses the output of the system including the electro-optic modulator as a function of the design parameters;

series expanding the mathematical expression for the output;

applying the desired harmonic performance to the series expansion; and solving for the design parameters.

32. The method of claim 31 wherein the design parameters include a parameter from the group consisting of:

a splitting ratio for the 1:N splitting section, a DC phase shift applied by the DC phase-shifting section, an RF coupling efficiency of the RF phase-shifting section, and a combining ratio of the N:1 combining section.

33. The method of claim 31 wherein the output is an output of a square law photodetector coupled to receive a modulated signal produced by the electro-optic modulator.

34. The method of claim 31 wherein series expanding the output includes expanding the output in a power series.

35. The method of claim 31 wherein series expanding the output includes expanding the output in a Fourier series.

36. The method of claim 31 wherein series expanding the output includes expanding the output in a Taylor series.

37. The method of claim 31 wherein selecting a desired harmonic performance includes selecting a maximum acceptable level for a higher order term.

38. The method of claim 37 wherein selecting a desired harmonic performance includes selecting a maximum acceptable level for a second order term.

39. The method of claim 37 wherein selecting a desired harmonic performance includes selecting a maximum acceptable level for a second order term and for a third order term.

40. The method of claim 37 wherein selecting a desired harmonic performance includes selecting a maximum acceptable level for a third order term.

41. The method of claim 37 wherein selecting a desired harmonic performance includes selecting a maximum acceptable level for a third order term and for a fifth order term.

42. The method of claim 31 further comprising selecting values for the design parameters to maximize a signal to noise ratio.

43. A method for designing an electro-optic modulator comprising:

identifying a desired harmonic performance for an output of an electro-optic modulator;

identifing design parameters for the electro-optic modulator;

determining an output of the electro-optic modulator in terms of the design parameters;

series expanding the output;

applying the desired harmonic performance to the series expansion; and selecting values for the design parameters to maximize a signal strength.

* * * * *

UNITED STATES PATENT AND TRADEMARK OFFICE
CERTIFICATE OF CORRECTION

PATENT NO. : 6,204,951 B1
DATED : March 20, 2001
INVENTOR(S) : James F. Coward, Ting K. Yee, Peter Chang, Abraham Kou Page 1 of 1

It is certified that error appears in the above-identified patent and that said Letters Patent is hereby corrected as shown below:

<u>Title page,</u>
<u>Column 1,</u>
"(73) Assignee: Keotrel Solutions …" should read "(73) Assignee: Kestrel Solutions …".

<u>Column 16,</u>
Line 3, "phase-shifig" should read "phase-shifting".

<u>Column 18,</u>
Line 56, delete "N=3;".
Line 57, "N" should read "three".

<u>Column 19,</u>
Line 27, "adiustably" should read "adjustably".
Line 41, "hnewidth" should read "linewidth".

Signed and Sealed this

Thirtieth Day of October, 2001

*Attest:*

NICHOLAS P. GODICI
*Attesting Officer*    Acting Director of the United States Patent and Trademark Office